(12) United States Patent
Zarrabi et al.

(10) Patent No.: US 9,195,058 B2
(45) Date of Patent: Nov. 24, 2015

(54) ELECTROACTIVE POLYMER ACTUATOR LENTICULAR SYSTEM

(75) Inventors: Alireza Zarrabi, Sunnyvale, CA (US); Dirk Schapeler, Mountain View, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 95 days.

(21) Appl. No.: 14/006,471

(22) PCT Filed: Mar. 22, 2012
(Under 37 CFR 1.47)

(86) PCT No.: PCT/US2012/030030
§ 371 (c)(1),
(2), (4) Date: Jan. 24, 2014

(87) PCT Pub. No.: WO2012/129357
PCT Pub. Date: Sep. 27, 2012

(65) Prior Publication Data
US 2015/0070740 A1    Mar. 12, 2015

Related U.S. Application Data

(60) Provisional application No. 61/466,129, filed on Mar. 22, 2011.

(51) Int. Cl.
*G02B 26/08* (2006.01)
*G02F 1/29* (2006.01)
*G03B 25/02* (2006.01)

(52) U.S. Cl.
CPC .............. *G02B 26/0875* (2013.01); *G02F 1/29* (2013.01); *G03B 25/02* (2013.01)

(58) Field of Classification Search
CPC .... G02B 15/14; G02B 26/0875; G02B 27/40; G02F 1/29; G03B 25/02
USPC ......... 359/209.1–210.2, 221.2, 813–814, 822
See application file for complete search history.

(56) References Cited

U.S. PATENT DOCUMENTS 2,430,013 A    11/1947    Hansell
2,967,914 A    1/1961    Pye
(Continued)

FOREIGN PATENT DOCUMENTS

CA    2329804 A1    11/1999
CA    2330384 A1    11/1999
(Continued)

OTHER PUBLICATIONS

International Search Report for PCT/US2012/030030, dated Oct. 29, 2012 (3 pages).
(Continued)

*Primary Examiner* — James Phan
(74) *Attorney, Agent, or Firm* — K&L Gates LLP

(57) ABSTRACT

The present invention provides an optical system comprising a lens element, a display unit displaced transversely from the lens element, at least one actuator coupled to at least one of the lens element or the display unit and capable of changing position of the lens element relative to the display unit in a lateral direction, and an electronic control system capable of driving the at least one actuator to move in a programmed manner to control positioning of the lens element relative to the display unit.

17 Claims, 9 Drawing Sheets

(56) References Cited

U.S. PATENT DOCUMENTS

| | | |
|---|---|---|
| 3,050,034 A | 8/1962 | Benton |
| 3,056,932 A | 10/1962 | Wood |
| 3,303,750 A | 2/1967 | Powell |
| 3,304,773 A | 2/1967 | Rogallo |
| 3,400,281 A | 9/1968 | Malik |
| 3,403,234 A | 9/1968 | Barnes, Jr. et al. |
| 3,463,942 A | 8/1969 | Mellon |
| 3,509,714 A | 5/1970 | Walton |
| 3,539,841 A | 11/1970 | Riff |
| 3,558,936 A | 1/1971 | Horan |
| 3,606,241 A | 9/1971 | Bornholdt |
| 3,783,480 A | 1/1974 | Booe |
| 3,798,473 A | 3/1974 | Murayama et al. |
| 3,801,839 A | 4/1974 | Yo |
| 3,816,774 A | 6/1974 | Ohnuki et al. |
| 3,821,967 A | 7/1974 | Sturman et al. |
| 3,832,580 A | 8/1974 | Yamamuro et al. |
| 3,851,363 A | 12/1974 | Booe |
| 3,903,733 A | 9/1975 | Murayama et al. |
| 3,935,485 A | 1/1976 | Yoshida et al. |
| 3,940,637 A | 2/1976 | Ohigashi et al. |
| 3,943,614 A | 3/1976 | Yoshikawa et al. |
| 3,947,644 A | 3/1976 | Uchikawa |
| 3,965,757 A | 6/1976 | Barrus |
| 4,011,474 A | 3/1977 | O'Neill |
| 4,028,566 A | 6/1977 | Franssen et al. |
| 4,051,395 A | 9/1977 | Taylor |
| 4,056,742 A | 11/1977 | Tibbetts |
| 4,088,915 A | 5/1978 | Kodama |
| 4,089,927 A | 5/1978 | Taylor |
| 4,127,749 A | 11/1978 | Atoji et al. |
| 4,140,936 A | 2/1979 | Bullock |
| 4,155,950 A | 5/1979 | Berezuk et al. |
| 4,158,787 A | 6/1979 | Forward |
| 4,170,742 A | 10/1979 | Itagaki et al. |
| 4,190,336 A | 2/1980 | Frank et al. |
| 4,216,403 A | 8/1980 | Krempl et al. |
| 4,227,347 A | 10/1980 | Tam |
| 4,234,813 A | 11/1980 | Iguchi et al. |
| 4,236,416 A | 12/1980 | Barcita |
| 4,240,535 A | 12/1980 | Pierce et al. |
| 4,245,815 A | 1/1981 | Willis |
| 4,257,594 A | 3/1981 | Conrey et al. |
| 4,266,339 A | 5/1981 | Kalt |
| 4,283,461 A | 8/1981 | Wooden et al. |
| 4,283,649 A | 8/1981 | Heinouchi |
| 4,284,921 A | 8/1981 | Lemonon et al. |
| 4,290,983 A | 9/1981 | Sasaki et al. |
| 4,297,394 A | 10/1981 | Wooden et al. |
| 4,315,433 A | 2/1982 | Edelman et al. |
| 4,322,877 A | 4/1982 | Taylor |
| 4,326,762 A | 4/1982 | Hockenbrock et al. |
| 4,330,730 A | 5/1982 | Kurz et al. |
| 4,342,936 A | 8/1982 | Marcus et al. |
| 4,344,743 A | 8/1982 | Bessman et al. |
| 4,346,505 A | 8/1982 | Lemonon et al. |
| 4,363,991 A | 12/1982 | Edelman |
| 4,376,302 A | 3/1983 | Miller |
| 4,384,394 A | 5/1983 | Lemonon et al. |
| 4,387,318 A | 6/1983 | Kolm et al. |
| 4,400,634 A | 8/1983 | Micheron |
| 4,401,911 A | 8/1983 | Ravinet et al. |
| 4,404,490 A | 9/1983 | Taylor et al. |
| 4,413,202 A | 11/1983 | Krempl et al. |
| 4,433,359 A | 2/1984 | Hamabe et al. |
| 4,434,452 A | 2/1984 | Hamabe et al. |
| 4,435,667 A | 3/1984 | Kolm et al. |
| 4,442,372 A | 4/1984 | Roberts |
| 4,469,920 A | 9/1984 | Murphy |
| 4,469,978 A | 9/1984 | Hamada et al. |
| 4,472,255 A | 9/1984 | Millington et al. |
| 4,473,806 A | 9/1984 | Johnston |
| 4,500,377 A | 2/1985 | Broussoux et al. |
| 4,518,555 A | 5/1985 | Ravinet et al. |
| 4,566,135 A | 1/1986 | Schmidt |
| 4,588,998 A | 5/1986 | Yamamuro et al. |
| 4,592,383 A | 6/1986 | Rikuta |
| 4,595,338 A | 6/1986 | Kolm et al. |
| 4,598,338 A | 7/1986 | Van Devender et al. |
| 4,605,167 A | 8/1986 | Maehara |
| 4,626,730 A | 12/1986 | Hubbard, Jr. |
| 4,638,207 A | 1/1987 | Radice |
| 4,654,554 A | 3/1987 | Kishi |
| 4,668,449 A | 5/1987 | Soni et al. |
| 4,678,955 A | 7/1987 | Toda |
| 4,686,440 A | 8/1987 | Hatamura et al. |
| 4,689,614 A | 8/1987 | Strachan |
| 4,704,556 A | 11/1987 | Kay |
| 4,715,396 A | 12/1987 | Fox |
| 4,733,121 A | 3/1988 | Hebert |
| 4,748,366 A | 5/1988 | Taylor |
| 4,762,733 A | 8/1988 | Thiel et al. |
| 4,783,888 A | 11/1988 | Fujii et al. |
| 4,784,479 A | 11/1988 | Ikemori |
| 4,785,837 A | 11/1988 | Hansen et al. |
| 4,786,837 A | 11/1988 | Kalnin et al. |
| 4,787,411 A | 11/1988 | Moldenhauer |
| 4,793,588 A | 12/1988 | Laverty, Jr. |
| 4,803,671 A | 2/1989 | Rochling et al. |
| 4,814,661 A | 3/1989 | Ratzlaff et al. |
| 4,820,236 A | 4/1989 | Berliner et al. |
| 4,824,107 A | 4/1989 | French |
| 4,825,116 A | 4/1989 | Itoh et al. |
| 4,833,659 A | 5/1989 | Geil et al. |
| 4,835,747 A | 5/1989 | Billet |
| 4,839,872 A | 6/1989 | Gragnolati et al. |
| 4,843,275 A | 6/1989 | Radice |
| 4,849,668 A | 7/1989 | Crawley et al. |
| 4,868,447 A | 9/1989 | Lee et al. |
| 4,869,282 A | 9/1989 | Sittler et al. |
| 4,870,868 A | 10/1989 | Gastgeb et al. |
| 4,877,957 A | 10/1989 | Okada et al. |
| 4,877,988 A | 10/1989 | McGinniss et al. |
| 4,879,698 A | 11/1989 | Langberg |
| 4,885,783 A | 12/1989 | Whitehead et al. |
| 4,885,830 A | 12/1989 | Ohtaka |
| 4,904,222 A | 2/1990 | Gastgeb et al. |
| 4,906,886 A | 3/1990 | Breimesser et al. |
| 4,911,057 A | 3/1990 | Fishman |
| 4,911,995 A | 3/1990 | Belanger et al. |
| 4,958,100 A | 9/1990 | Crawley et al. |
| 4,961,956 A | 10/1990 | Simopoulos et al. |
| 4,969,197 A | 11/1990 | Takaya |
| 4,971,287 A | 11/1990 | Shaw |
| 4,980,597 A | 12/1990 | Iwao |
| 4,989,951 A | 2/1991 | Miyano et al. |
| 5,024,872 A | 6/1991 | Wilson et al. |
| RE33,651 E | 7/1991 | Blonder et al. |
| 5,030,874 A | 7/1991 | Saito et al. |
| 5,065,067 A | 11/1991 | Todd et al. |
| 5,076,538 A | 12/1991 | Mohr et al. |
| 5,085,401 A | 2/1992 | Botting et al. |
| 5,090,246 A | 2/1992 | Colla et al. |
| 5,090,794 A | 2/1992 | Hatano et al. |
| 5,100,100 A | 3/1992 | Benson et al. |
| 5,119,840 A | 6/1992 | Shibata |
| 5,132,582 A | 7/1992 | Hayashi et al. |
| 5,142,510 A | 8/1992 | Rodda |
| 5,148,735 A | 9/1992 | Veletovac |
| 5,149,514 A | 9/1992 | Sanjurjo |
| 5,153,820 A | 10/1992 | MacFarlane et al. |
| 5,153,859 A | 10/1992 | Chatigny et al. |
| 5,156,885 A | 10/1992 | Budd |
| 5,170,089 A | 12/1992 | Fulton |
| 5,171,734 A | 12/1992 | Sanjurjo et al. |
| 5,172,024 A | 12/1992 | Broussoux et al. |
| 5,188,447 A | 2/1993 | Chiang et al. |
| 5,199,641 A | 4/1993 | Hohm et al. |
| 5,206,557 A | 4/1993 | Bobbio |
| 5,229,979 A | 7/1993 | Scheinbeim et al. |
| 5,232,196 A | 8/1993 | Hutchings et al. |
| 5,240,004 A | 8/1993 | Walinsky et al. |
| 5,244,707 A | 9/1993 | Shores |
| 5,250,784 A | 10/1993 | Muller et al. |

(56) References Cited

U.S. PATENT DOCUMENTS

| | | |
|---|---|---|
| 5,254,296 A | 10/1993 | Perlman |
| 5,258,201 A | 11/1993 | Munn et al. |
| 5,281,885 A | 1/1994 | Watanabe et al. |
| 5,288,551 A | 2/1994 | Sato et al. |
| 5,291,335 A | 3/1994 | Ogino |
| 5,302,318 A | 4/1994 | Dutta et al. |
| 5,305,178 A | 4/1994 | Binder et al. |
| 5,321,332 A | 6/1994 | Toda |
| 5,350,966 A | 9/1994 | Culp |
| 5,352,574 A | 10/1994 | Guiseppi-Elie |
| 5,356,500 A | 10/1994 | Scheinbeim et al. |
| 5,361,240 A | 11/1994 | Pearce |
| 5,368,704 A | 11/1994 | Madou et al. |
| 5,369,995 A | 12/1994 | Scheinbeim et al. |
| 5,377,258 A | 12/1994 | Bro |
| 5,380,396 A | 1/1995 | Shikida et al. |
| 5,410,210 A | 4/1995 | Sato et al. |
| 5,417,235 A | 5/1995 | Wise et al. |
| 5,424,596 A | 6/1995 | Mendenhall et al. |
| 5,428,523 A | 6/1995 | McDonnal |
| 5,430,565 A | 7/1995 | Yamanouchi et al. |
| 5,438,553 A | 8/1995 | Wilson et al. |
| 5,440,194 A | 8/1995 | Beurrier |
| 5,452,878 A | 9/1995 | Gravesen et al. |
| 5,481,152 A | 1/1996 | Bushulte |
| 5,488,872 A | 2/1996 | McCormick |
| 5,493,372 A | 2/1996 | Mashtare et al. |
| 5,495,137 A | 2/1996 | Park et al. |
| 5,499,127 A | 3/1996 | Tsubota et al. |
| 5,500,635 A | 3/1996 | Mott |
| 5,504,388 A | 4/1996 | Kimura et al. |
| 5,509,888 A | 4/1996 | Miller |
| 5,515,341 A | 5/1996 | Toda et al. |
| 5,548,177 A | 8/1996 | Carroll |
| 5,559,387 A | 9/1996 | Beurrier |
| 5,563,466 A | 10/1996 | Rennex et al. |
| 5,571,148 A | 11/1996 | Loeb et al. |
| 5,578,889 A | 11/1996 | Epstein |
| 5,589,725 A | 12/1996 | Haertling |
| 5,591,986 A | 1/1997 | Niigaki et al. |
| 5,593,462 A | 1/1997 | Gueguen et al. |
| 5,632,841 A | 5/1997 | Hellbaum et al. |
| 5,636,072 A | 6/1997 | Shibata et al. |
| 5,636,100 A | 6/1997 | Zheng et al. |
| 5,642,015 A | 6/1997 | Whitehead et al. |
| 5,647,245 A | 7/1997 | Takei |
| 5,668,703 A | 9/1997 | Rossi et al. |
| 5,678,571 A | 10/1997 | Brown |
| 5,682,075 A | 10/1997 | Bolleman et al. |
| 5,684,637 A | 11/1997 | Floyd |
| 5,696,663 A | 12/1997 | Unami et al. |
| 5,703,295 A | 12/1997 | Ishida et al. |
| 5,717,563 A | 2/1998 | MacDougall et al. |
| 5,722,418 A | 3/1998 | Bro |
| 5,744,908 A | 4/1998 | Kyushima |
| 5,751,090 A | 5/1998 | Henderson |
| 5,755,909 A | 5/1998 | Gailus |
| 5,761,782 A | 6/1998 | Sager |
| 5,766,934 A | 6/1998 | Guiseppi-Elie |
| 5,777,540 A | 7/1998 | Dedert et al. |
| 5,788,468 A | 8/1998 | Dewa et al. |
| 5,800,421 A | 9/1998 | Lemelson |
| 5,801,475 A | 9/1998 | Kimura |
| 5,814,921 A | 9/1998 | Carroll |
| 5,828,157 A | 10/1998 | Miki et al. |
| 5,831,371 A | 11/1998 | Bishop |
| 5,835,453 A | 11/1998 | Wynne et al. |
| 5,847,690 A | 12/1998 | Boie et al. |
| 5,857,694 A | 1/1999 | Lazarus et al. |
| 5,876,675 A | 3/1999 | Kennedy |
| 5,883,466 A | 3/1999 | Suyama et al. |
| 5,889,354 A | 3/1999 | Sager |
| 5,892,314 A | 4/1999 | Sager et al. |
| 5,896,287 A | 4/1999 | Mihara et al. |
| 5,897,097 A | 4/1999 | Biegelsen et al. |
| 5,900,572 A | 5/1999 | Aeroe |
| 5,902,836 A | 5/1999 | Bennett et al. |
| 5,910,107 A | 6/1999 | Iliff |
| 5,912,499 A | 6/1999 | Diem et al. |
| 5,913,310 A | 6/1999 | Brown |
| 5,914,901 A | 6/1999 | Pascucci |
| 5,915,377 A | 6/1999 | Coffee |
| 5,918,502 A | 7/1999 | Bishop |
| 5,928,262 A | 7/1999 | Harber |
| 5,928,547 A | 7/1999 | Shea et al. |
| 5,933,170 A | 8/1999 | Takeuchi et al. |
| 5,971,355 A | 10/1999 | Biegelsen et al. |
| 5,977,685 A | 11/1999 | Kurita et al. |
| 5,984,760 A | 11/1999 | Marine |
| 5,988,902 A | 11/1999 | Holehan |
| 6,012,961 A | 1/2000 | Sharpe, III et al. |
| 6,037,707 A | 3/2000 | Gailus et al. |
| 6,048,276 A | 4/2000 | Vandergrift |
| 6,048,622 A | 4/2000 | Hagood, IV et al. |
| 6,055,859 A | 5/2000 | Kozuka et al. |
| 6,059,546 A | 5/2000 | Brenan et al. |
| 6,060,811 A | 5/2000 | Fox et al. |
| 6,069,420 A | 5/2000 | Mizzi et al. |
| 6,074,178 A | 6/2000 | Bishop et al. |
| 6,075,504 A | 6/2000 | Stoller |
| 6,078,126 A | 6/2000 | Rollins et al. |
| 6,084,321 A | 7/2000 | Hunter et al. |
| 6,089,701 A | 7/2000 | Hashizume et al. |
| 6,093,078 A | 7/2000 | Cook |
| 6,093,995 A | 7/2000 | Lazarus et al. |
| 6,094,988 A | 8/2000 | Aindow |
| 6,097,821 A | 8/2000 | Yokoyama et al. |
| 6,108,275 A | 8/2000 | Hughes et al. |
| 6,111,743 A | 8/2000 | Lavene |
| 6,117,396 A | 9/2000 | Demers |
| 6,130,510 A | 10/2000 | Kurihara et al. |
| 6,133,398 A | 10/2000 | Bhat et al. |
| 6,140,131 A | 10/2000 | Sunakawa et al. |
| 6,140,740 A | 10/2000 | Porat et al. |
| 6,140,746 A | 10/2000 | Miyashita et al. |
| 6,148,842 A | 11/2000 | Kappel et al. |
| 6,156,842 A | 12/2000 | Hoenig et al. |
| 6,157,528 A | 12/2000 | Anthony |
| 6,161,966 A | 12/2000 | Chang et al. |
| 6,165,126 A | 12/2000 | Merzenich et al. |
| 6,168,133 B1 | 1/2001 | Heinz et al. |
| 6,181,351 B1 | 1/2001 | Merrill et al. |
| 6,184,044 B1 | 2/2001 | Sone et al. |
| 6,184,608 B1 | 2/2001 | Cabuz et al. |
| 6,184,609 B1 | 2/2001 | Johansson et al. |
| 6,184,844 B1 | 2/2001 | Filipovic et al. |
| 6,190,805 B1 | 2/2001 | Takeuchi et al. |
| 6,194,815 B1 | 2/2001 | Carroll |
| 6,196,935 B1 | 3/2001 | Spangler et al. |
| 6,198,203 B1 | 3/2001 | Hotomi |
| 6,198,204 B1 | 3/2001 | Pottenger |
| 6,201,398 B1 | 3/2001 | Takada |
| 6,210,827 B1 | 4/2001 | Dopp et al. |
| 6,228,533 B1 | 5/2001 | Ohashi et al. |
| 6,232,702 B1 | 5/2001 | Newnham et al. |
| 6,239,535 B1 | 5/2001 | Toda et al. |
| 6,239,536 B1 | 5/2001 | Lakin |
| 6,240,814 B1 | 6/2001 | Boyd et al. |
| 6,248,262 B1 | 6/2001 | Kubotera et al. |
| 6,249,076 B1 | 6/2001 | Madden et al. |
| 6,252,221 B1 | 6/2001 | Kaneko et al. |
| 6,252,334 B1 | 6/2001 | Nye et al. |
| 6,252,336 B1 | 6/2001 | Hall |
| 6,255,758 B1 | 7/2001 | Cabuz et al. |
| 6,262,516 B1 | 7/2001 | Fukuda et al. |
| 6,268,219 B1 | 7/2001 | McBride et al. |
| 6,282,074 B1 | 8/2001 | Anthony |
| 6,284,435 B1 | 9/2001 | Cao |
| 6,286,961 B1 | 9/2001 | Ogawa |
| 6,291,155 B1 | 9/2001 | Raguse et al. |
| 6,291,928 B1 | 9/2001 | Lazarus et al. |
| 6,294,859 B1 | 9/2001 | Jaenker |
| 6,297,579 B1 | 10/2001 | Martin et al. |
| 6,311,950 B1 | 11/2001 | Kappel et al. |

(56) References Cited

U.S. PATENT DOCUMENTS

| | | |
|---|---|---|
| 6,316,084 B1 | 11/2001 | Claus et al. |
| 6,321,428 B1 | 11/2001 | Toda et al. |
| 6,330,463 B1 | 12/2001 | Hedrich |
| 6,333,595 B1 | 12/2001 | Horikawa et al. |
| 6,334,673 B1 | 1/2002 | Kitahara et al. |
| 6,336,880 B1 | 1/2002 | Agner |
| 6,339,527 B1 | 1/2002 | Farooq et al. |
| 6,343,129 B1 | 1/2002 | Pelrine et al. |
| 6,345,840 B1 | 2/2002 | Meyer et al. |
| 6,349,141 B1 | 2/2002 | Corsaro |
| 6,355,185 B1 | 3/2002 | Kubota |
| 6,358,021 B1 | 3/2002 | Cabuz |
| 6,359,370 B1 | 3/2002 | Chang |
| 6,366,193 B2 | 4/2002 | Duggal et al. |
| 6,369,954 B1 | 4/2002 | Berge et al. |
| 6,375,857 B1 | 4/2002 | Ng et al. |
| 6,376,971 B1 | 4/2002 | Pelrine et al. |
| 6,377,383 B1 | 4/2002 | Whitehead et al. |
| 6,379,393 B1 | 4/2002 | Marvroidis et al. |
| 6,379,809 B1 | 4/2002 | Simpson et al. |
| 6,385,021 B1 | 5/2002 | Takeda et al. |
| 6,385,429 B1 | 5/2002 | Weber et al. |
| 6,388,043 B1 | 5/2002 | Langer et al. |
| 6,388,553 B1 | 5/2002 | Shea et al. |
| 6,388,856 B1 | 5/2002 | Anthony |
| 6,400,065 B1 | 6/2002 | Toda et al. |
| 6,404,107 B1 | 6/2002 | Lazarus et al. |
| 6,411,009 B2 | 6/2002 | Jaenker |
| 6,411,013 B1 | 6/2002 | Horning |
| 6,424,079 B1 | 7/2002 | Carroll |
| 6,429,573 B2 | 8/2002 | Koopmann et al. |
| 6,429,576 B1 | 8/2002 | Simes |
| 6,433,689 B1 | 8/2002 | Hovind et al. |
| 6,434,245 B1 | 8/2002 | Zimmermann |
| 6,435,840 B1 | 8/2002 | Sharma et al. |
| 6,436,531 B1 | 8/2002 | Kollaja et al. |
| 6,437,489 B1 | 8/2002 | Shinke et al. |
| 6,457,697 B1 | 10/2002 | Kolze |
| 6,459,088 B1 | 10/2002 | Yasuda et al. |
| 6,471,185 B2 | 10/2002 | Lewin et al. |
| 6,475,931 B2 | 11/2002 | Bower et al. |
| 6,486,589 B1 | 11/2002 | Dujari et al. |
| 6,492,762 B1 | 12/2002 | Pant et al. |
| 6,495,945 B2 | 12/2002 | Yamaguchi et al. |
| 6,499,509 B2 | 12/2002 | Berger et al. |
| 6,502,803 B1 | 1/2003 | Mattes |
| 6,504,286 B1 | 1/2003 | Porat et al. |
| 6,509,802 B2 | 1/2003 | Kasperkovitz |
| 6,514,237 B1 | 2/2003 | Maseda |
| 6,522,516 B2 | 2/2003 | Anthony |
| 6,523,560 B1 | 2/2003 | Williams et al. |
| 6,528,928 B1 | 3/2003 | Burns et al. |
| 6,530,266 B1 | 3/2003 | Adderton et al. |
| 6,532,145 B1 | 3/2003 | Carlen et al. |
| 6,543,110 B1 | 4/2003 | Pelrine et al. |
| 6,545,384 B1 | 4/2003 | Pelrine et al. |
| 6,562,513 B1 | 5/2003 | Takeuchi et al. |
| 6,583,533 B2 | 6/2003 | Pelrine et al. |
| 6,586,859 B2 | 7/2003 | Kornbluh et al. |
| 6,590,267 B1 | 7/2003 | Goodwin-Johansson et al. |
| 6,593,155 B2 | 7/2003 | Mohler et al. |
| 6,613,816 B2 | 9/2003 | Mahdi et al. |
| 6,617,759 B1 | 9/2003 | Zumeris et al. |
| 6,617,765 B1 | 9/2003 | Lagier et al. |
| 6,619,799 B1 | 9/2003 | Blum et al. |
| 6,628,040 B2 | 9/2003 | Pelrine et al. |
| 6,631,068 B1 | 10/2003 | Lobo |
| 6,637,276 B2 | 10/2003 | Adderton et al. |
| 6,640,402 B1 | 11/2003 | Vooren et al. |
| 6,644,027 B1 | 11/2003 | Kelly |
| 6,646,077 B1 | 11/2003 | Lyons |
| 6,650,455 B2 | 11/2003 | Miles |
| 6,652,938 B1 | 11/2003 | Nishikawa et al. |
| 6,654,004 B2 | 11/2003 | Hoggarth |
| 6,664,718 B2 | 12/2003 | Pelrine et al. |
| 6,668,109 B2 | 12/2003 | Nahum et al. |
| 6,673,533 B1 | 1/2004 | Wohlstadter et al. |
| 6,680,825 B1 | 1/2004 | Murphy et al. |
| 6,682,500 B2 | 1/2004 | Soltanpour et al. |
| 6,690,101 B2 | 2/2004 | Magnussen et al. |
| 6,700,314 B2 | 3/2004 | Cuhat et al. |
| 6,701,296 B1 | 3/2004 | Kramer et al. |
| 6,707,236 B2 | 3/2004 | Pelrine et al. |
| 6,720,710 B1 | 4/2004 | Wenzel et al. |
| 6,733,130 B2 | 5/2004 | Blum et al. |
| 6,743,273 B2 | 6/2004 | Chung et al. |
| 6,762,050 B2 | 7/2004 | Fukushima et al. |
| 6,768,246 B2 | 7/2004 | Pelrine et al. |
| 6,781,284 B1 | 8/2004 | Pelrine et al. |
| 6,784,227 B2 | 8/2004 | Simon et al. |
| 6,791,205 B2 | 9/2004 | Woodbridge |
| 6,800,155 B2 | 10/2004 | Senecal et al. |
| 6,804,068 B2 | 10/2004 | Sasaki et al. |
| 6,806,621 B2 | 10/2004 | Heim et al. |
| 6,806,806 B2 | 10/2004 | Anthony |
| 6,806,808 B1 | 10/2004 | Watters et al. |
| 6,809,462 B2 | 10/2004 | Pelrine et al. |
| 6,809,928 B2 | 10/2004 | Gwin et al. |
| 6,812,624 B1 | 11/2004 | Pei et al. |
| 6,824,689 B2 | 11/2004 | Wang et al. |
| 6,847,153 B1 | 1/2005 | Balizer |
| 6,847,155 B2 | 1/2005 | Schwartz et al. |
| 6,856,305 B2 | 2/2005 | Nagano |
| 6,864,592 B1 | 3/2005 | Kelly |
| 6,866,242 B2 | 3/2005 | Hirota |
| 6,867,533 B1 | 3/2005 | Su et al. |
| 6,869,275 B2 | 3/2005 | Dante et al. |
| 6,876,135 B2 | 4/2005 | Pelrine et al. |
| 6,879,318 B1 | 4/2005 | Chan et al. |
| 6,882,086 B2 | 4/2005 | Kornbluh et al. |
| 6,891,317 B2 | 5/2005 | Pei et al. |
| 6,902,048 B1 | 6/2005 | Chung |
| 6,911,764 B2 | 6/2005 | Pelrine et al. |
| 6,935,287 B2 | 8/2005 | Shinogle |
| 6,938,945 B2 | 9/2005 | Wald et al. |
| 6,940,211 B2 | 9/2005 | Pelrine et al. |
| 6,940,212 B2 | 9/2005 | Mueller |
| 6,940,221 B2 | 9/2005 | Matsukiyo et al. |
| 6,944,931 B2 | 9/2005 | Shcheglov et al. |
| 6,952,313 B2 | 10/2005 | Schrader |
| 6,967,430 B2 | 11/2005 | Johansson |
| 6,994,314 B2 | 2/2006 | Garnier et al. |
| 6,997,870 B2 | 2/2006 | Couvillon, Jr. |
| 7,008,838 B1 | 3/2006 | Hosking et al. |
| 7,011,378 B2 | 3/2006 | Maluf et al. |
| 7,011,760 B2 | 3/2006 | Wang et al. |
| 7,029,056 B2 | 4/2006 | Browne et al. |
| 7,034,432 B1 | 4/2006 | Pelrine et al. |
| 7,037,270 B2 | 5/2006 | Seward |
| 7,038,357 B2 | 5/2006 | Goldenberg et al. |
| 7,049,732 B2 | 5/2006 | Pei et al. |
| 7,052,594 B2 | 5/2006 | Pelrine et al. |
| 7,062,055 B2 | 6/2006 | Pelrine et al. |
| 7,063,268 B2 | 6/2006 | Chrysler et al. |
| 7,063,377 B2 | 6/2006 | Brei et al. |
| 7,064,472 B2 | 6/2006 | Pelrine et al. |
| 7,071,596 B2 | 7/2006 | Krill |
| 7,075,162 B2 | 7/2006 | Unger |
| 7,075,213 B2 | 7/2006 | Krill |
| 7,092,238 B2 | 8/2006 | Saito et al. |
| 7,099,141 B1 | 8/2006 | Kaufman et al. |
| 7,104,146 B2 | 9/2006 | Benslimane et al. |
| 7,109,643 B2 | 9/2006 | Hirai et al. |
| 7,113,318 B2 | 9/2006 | Onuki et al. |
| 7,113,848 B2 | 9/2006 | Hanson |
| 7,115,092 B2 | 10/2006 | Park et al. |
| 7,140,180 B2 | 11/2006 | Gerber et al. |
| 7,141,888 B2 | 11/2006 | Sabol et al. |
| 7,142,368 B2 | 11/2006 | Kim et al. |
| 7,142,369 B2 | 11/2006 | Wu et al. |
| 7,144,616 B1 | 12/2006 | Unger et al. |
| 7,148,789 B2 | 12/2006 | Sadler et al. |
| 7,164,212 B2 | 1/2007 | Leijon et al. |
| 7,166,952 B2 | 1/2007 | Topliss et al. |

(56) References Cited

U.S. PATENT DOCUMENTS

| | | | |
|---|---|---|---|
| 7,166,953 | B2 | 1/2007 | Heim et al. |
| 7,170,665 | B2 | 1/2007 | Kaneko et al. |
| 7,190,016 | B2 | 3/2007 | Cahalen et al. |
| 7,193,350 | B1 | 3/2007 | Blackburn et al. |
| 7,195,393 | B2 | 3/2007 | Potter |
| 7,195,950 | B2 | 3/2007 | Taussig |
| 7,196,688 | B2 | 3/2007 | Schena |
| 7,199,302 | B2 | 4/2007 | Raisanen |
| 7,199,501 | B2 | 4/2007 | Pei et al. |
| 7,205,704 | B2 | 4/2007 | Audren et al. |
| 7,205,978 | B2 | 4/2007 | Poupyrev et al. |
| 7,209,280 | B2 | 4/2007 | Goossens |
| 7,211,937 | B2 | 5/2007 | Kornbluh et al. |
| 7,220,785 | B2 | 5/2007 | Saito |
| 7,224,106 | B2 | 5/2007 | Pei et al. |
| 7,233,097 | B2 | 6/2007 | Rosenthal et al. |
| 7,235,152 | B2 | 6/2007 | Bell et al. |
| 7,237,524 | B2 | 7/2007 | Pelrine et al. |
| 7,242,106 | B2 | 7/2007 | Kelly |
| 7,245,440 | B2 | 7/2007 | Peseux |
| 7,256,943 | B1 | 8/2007 | Kobrin et al. |
| 7,259,495 | B2 | 8/2007 | Asai et al. |
| 7,259,503 | B2 | 8/2007 | Pei et al. |
| 7,276,090 | B2 | 10/2007 | Shahinpoor et al. |
| 7,291,512 | B2 | 11/2007 | Unger |
| 7,298,054 | B2 | 11/2007 | Hirsch |
| 7,298,559 | B2 | 11/2007 | Kato et al. |
| 7,298,603 | B2 | 11/2007 | Mizuno et al. |
| 7,301,261 | B2 | 11/2007 | Ifuku et al. |
| 7,310,874 | B2 | 12/2007 | Higuchi et al. |
| 7,312,917 | B2 | 12/2007 | Jacob |
| 7,320,457 | B2 | 1/2008 | Heim et al. |
| 7,321,185 | B2 | 1/2008 | Schultz |
| 7,323,790 | B2 | 1/2008 | Taylor et al. |
| 7,332,688 | B2 | 2/2008 | Browne et al. |
| 7,339,285 | B2 | 3/2008 | Negron Crespo |
| 7,339,572 | B2 | 3/2008 | Schena |
| 7,342,573 | B2 | 3/2008 | Ryynanen |
| 7,355,293 | B2 | 4/2008 | Bernhoff et al. |
| 7,359,124 | B1 | 4/2008 | Fang et al. |
| 7,362,031 | B2 | 4/2008 | Maita et al. |
| 7,362,032 | B2 | 4/2008 | Pelrine et al. |
| 7,362,889 | B2 | 4/2008 | Dubowsky et al. |
| 7,368,862 | B2 | 5/2008 | Pelrine et al. |
| 7,371,596 | B2 | 5/2008 | Warner, Jr. et al. |
| 7,373,454 | B1 | 5/2008 | Noe |
| 7,378,783 | B2 | 5/2008 | Pelrine et al. |
| 7,392,876 | B2 | 7/2008 | Browne et al. |
| 7,394,182 | B2 | 7/2008 | Pelrine et al. |
| 7,394,282 | B2 | 7/2008 | Sinha et al. |
| 7,394,641 | B2 | 7/2008 | Won et al. |
| 7,397,166 | B1 | 7/2008 | Morgan et al. |
| 7,401,846 | B2 | 7/2008 | Browne et al. |
| 7,411,332 | B2 | 8/2008 | Kornbluh et al. |
| 7,426,340 | B2 | 9/2008 | Seo |
| 7,429,074 | B2 | 9/2008 | McKnight et al. |
| 7,429,495 | B2 | 9/2008 | Wan |
| 7,436,099 | B2 | 10/2008 | Pei et al. |
| 7,436,646 | B2 | 10/2008 | Delince et al. |
| 7,442,421 | B2 | 10/2008 | Li et al. |
| 7,442,760 | B2 | 10/2008 | Roberts et al. |
| 7,444,072 | B2 | 10/2008 | Seo |
| 7,446,926 | B2 | 11/2008 | Sampsell |
| 7,449,821 | B2 | 11/2008 | Dausch |
| 7,454,820 | B2 | 11/2008 | Nakamura |
| 7,456,549 | B2 | 11/2008 | Heim et al. |
| 7,468,575 | B2 | 12/2008 | Pelrine et al. |
| 7,481,120 | B2 | 1/2009 | Gravesen et al. |
| 7,492,076 | B2 | 2/2009 | Heim et al. |
| 7,498,729 | B2 | 3/2009 | Ogino |
| 7,499,223 | B2 | 3/2009 | Berge et al. |
| 7,511,706 | B2 | 3/2009 | Schena |
| 7,513,624 | B2 | 4/2009 | Yavid et al. |
| 7,515,350 | B2 | 4/2009 | Berge et al. |
| 7,518,284 | B2 | 4/2009 | Benslimane et al. |
| 7,521,840 | B2 | 4/2009 | Heim |
| 7,521,847 | B2 | 4/2009 | Heim |
| 7,537,197 | B2 | 5/2009 | Heim et al. |
| 7,548,015 | B2 | 6/2009 | Benslimane et al. |
| 7,548,232 | B2 | 6/2009 | Shahoian et al. |
| 7,567,681 | B2 | 7/2009 | Pelrine et al. |
| 7,573,064 | B2 | 8/2009 | Benslimane et al. |
| 7,585,122 | B2 | 9/2009 | Eromaki et al. |
| 7,586,242 | B2 | 9/2009 | Yokoyama et al. |
| 7,595,580 | B2 | 9/2009 | Heim |
| 7,608,989 | B2 | 10/2009 | Heydt et al. |
| 7,626,319 | B2 | 12/2009 | Heim |
| 7,646,544 | B2 | 1/2010 | Batchko et al. |
| 7,648,118 | B2 | 1/2010 | Ukpai et al. |
| 7,659,918 | B2 | 2/2010 | Turner |
| 7,679,267 | B2 | 3/2010 | Heim |
| 7,679,839 | B2 | 3/2010 | Polyakov et al. |
| 7,690,622 | B2 | 4/2010 | Ito et al. |
| 7,702,227 | B2 | 4/2010 | Ito et al. |
| 7,703,740 | B1 | 4/2010 | Franklin |
| 7,703,742 | B2 | 4/2010 | Heim et al. |
| 7,703,839 | B2 | 4/2010 | McKnight et al. |
| 7,705,521 | B2 | 4/2010 | Pelrine et al. |
| 7,714,701 | B2 | 5/2010 | Altan et al. |
| 7,732,999 | B2 | 6/2010 | Clausen et al. |
| 7,733,575 | B2 | 6/2010 | Heim et al. |
| 7,750,532 | B2 | 7/2010 | Heim |
| 7,750,617 | B2 | 7/2010 | Omi |
| 7,761,981 | B2 | 7/2010 | Rosenthal et al. |
| 7,785,656 | B2 | 8/2010 | Pei et al. |
| 7,787,646 | B2 | 8/2010 | Pelrine et al. |
| 7,813,047 | B2 | 10/2010 | Wang et al. |
| 7,824,580 | B2 | 11/2010 | Boll et al. |
| 7,886,993 | B2 | 2/2011 | Bachmaier et al. |
| 7,893,965 | B2 | 2/2011 | Heim et al. |
| 7,898,159 | B2 | 3/2011 | Heydt et al. |
| 7,911,115 | B2 | 3/2011 | Pelrine et al. |
| 7,911,761 | B2 | 3/2011 | Biggs et al. |
| 7,915,789 | B2 | 3/2011 | Smith |
| 7,915,790 | B2 | 3/2011 | Heim et al. |
| 7,921,541 | B2 | 4/2011 | Pei et al. |
| 7,923,064 | B2 | 4/2011 | Pelrine et al. |
| 7,923,902 | B2 | 4/2011 | Heim |
| 7,923,982 | B2 | 4/2011 | Sumita |
| 7,940,476 | B2 | 5/2011 | Polyakov et al. |
| 7,952,261 | B2 | 5/2011 | Lipton et al. |
| 7,971,850 | B2 | 7/2011 | Heim et al. |
| 7,980,671 | B2 | 7/2011 | Nystrom et al. |
| 7,986,466 | B2 | 7/2011 | Lee et al. |
| 7,990,022 | B2 | 8/2011 | Heim |
| 8,004,339 | B2 | 8/2011 | Barrow |
| 8,026,023 | B2 | 9/2011 | Hamada |
| 8,042,264 | B2 | 10/2011 | Rosenthal et al. |
| 8,049,333 | B2 | 11/2011 | Alden et al. |
| 8,054,566 | B2 | 11/2011 | Heim et al. |
| 8,058,861 | B2 | 11/2011 | Pelrine et al. |
| 8,072,121 | B2 | 12/2011 | Heim et al. |
| 8,074,939 | B2 | 12/2011 | Hyde et al. |
| 8,093,783 | B2 | 1/2012 | Rosenthal et al. |
| 8,127,437 | B2 | 3/2012 | Lipton et al. |
| 8,133,932 | B2 | 3/2012 | Kijlstra et al. |
| 8,164,835 | B2 | 4/2012 | Heim et al. |
| 8,172,998 | B2 | 5/2012 | Bennett et al. |
| 8,183,739 | B2 | 5/2012 | Heim |
| 8,221,944 | B2 | 7/2012 | Shirasaki et al. |
| 8,222,799 | B2 | 7/2012 | Polyakov et al. |
| 8,237,324 | B2 | 8/2012 | Pei et al. |
| 8,248,750 | B2 | 8/2012 | Biggs et al. |
| 8,258,238 | B2 | 9/2012 | Boersma et al. |
| 8,283,839 | B2 | 10/2012 | Heim |
| 8,294,600 | B2 | 10/2012 | Peterson et al. |
| 8,310,444 | B2 | 11/2012 | Peterson et al. |
| 8,316,526 | B2 | 11/2012 | Pei et al. |
| 8,319,403 | B2 | 11/2012 | Lipton et al. |
| 8,419,822 | B2 | 4/2013 | Li |
| 8,421,316 | B2 | 4/2013 | Tryson et al. |
| 8,508,109 | B2 | 8/2013 | Kurihara et al. |
| 8,545,987 | B2 | 10/2013 | Strader et al. |
| 8,585,007 | B2 | 11/2013 | Schapeler et al. |

(56) References Cited

U.S. PATENT DOCUMENTS

| | | | |
|---|---|---|---|
| 8,594,839 B2 | 11/2013 | Hanson | |
| 8,679,575 B2 | 3/2014 | Biggs et al. | |
| 8,679,621 B2 | 3/2014 | Blaiszik et al. | |
| 8,779,650 B2 | 7/2014 | Jenninger et al. | |
| 8,842,355 B2 | 9/2014 | Lipton et al. | |
| 8,975,888 B2 | 3/2015 | Pelrine et al. | |
| 8,981,621 B2 | 3/2015 | Pelrine et al. | |
| RE45,464 E | 4/2015 | Kornbluh et al. | |
| 2001/0007449 A1 | 7/2001 | Kobachi et al. | |
| 2002/0083858 A1 | 7/2002 | MacDiarmid et al. | |
| 2004/0014860 A1 | 1/2004 | Meier et al. | |
| 2004/0046739 A1 | 3/2004 | Gettemy | |
| 2004/0124738 A1 | 7/2004 | Pelrine et al. | |
| 2005/0002113 A1 | 1/2005 | Berge | |
| 2005/0046312 A1 | 3/2005 | Tetsu | |
| 2005/0085693 A1 | 4/2005 | Belson et al. | |
| 2005/0113892 A1 | 5/2005 | Sproul | |
| 2005/0140922 A1 | 6/2005 | Bekerman et al. | |
| 2005/0200984 A1 | 9/2005 | Browne et al. | |
| 2006/0057377 A1 | 3/2006 | Harrison et al. | |
| 2006/0079619 A1 | 4/2006 | Wang et al. | |
| 2006/0122954 A1 | 6/2006 | Podlasek et al. | |
| 2006/0138371 A1 | 6/2006 | Garnier | |
| 2006/0197741 A1 | 9/2006 | Biggadike | |
| 2006/0238069 A1 | 10/2006 | Maruyama et al. | |
| 2006/0258912 A1 | 11/2006 | Belson et al. | |
| 2007/0080435 A1 | 4/2007 | Lin | |
| 2007/0122132 A1 | 5/2007 | Misawa et al. | |
| 2007/0152982 A1 | 7/2007 | Kim et al. | |
| 2007/0170910 A1 | 7/2007 | Chang et al. | |
| 2007/0173602 A1 | 7/2007 | Brinkman et al. | |
| 2007/0189667 A1* | 8/2007 | Wakita et al. | 385/31 |
| 2007/0200457 A1 | 8/2007 | Heim et al. | |
| 2007/0219285 A1 | 9/2007 | Kropp et al. | |
| 2007/0230222 A1 | 10/2007 | Drabing et al. | |
| 2008/0062589 A1 | 3/2008 | Drabing | |
| 2008/0143696 A1 | 6/2008 | Goulthorpe | |
| 2008/0152921 A1 | 6/2008 | Kropp | |
| 2008/0303782 A1 | 12/2008 | Grant et al. | |
| 2009/0184606 A1 | 7/2009 | Rosenthal et al. | |
| 2009/0250021 A1 | 10/2009 | Zarrabi et al. | |
| 2009/0297829 A1 | 12/2009 | Pyles et al. | |
| 2010/0236843 A1 | 9/2010 | Englund | |
| 2011/0021917 A1 | 1/2011 | Morita | |
| 2011/0128239 A1 | 6/2011 | Polyakov et al. | |
| 2011/0155307 A1 | 6/2011 | Pelrine et al. | |
| 2011/0256383 A1 | 10/2011 | Cochet et al. | |
| 2011/0285247 A1 | 11/2011 | Lipton et al. | |
| 2012/0128960 A1 | 5/2012 | Büsgen | |
| 2014/0014715 A1 | 1/2014 | Moran et al. | |
| 2014/0176753 A1* | 6/2014 | Hillis et al. | 348/222.1 |
| 2014/0290834 A1 | 10/2014 | Egron et al. | |
| 2014/0319971 A1 | 10/2014 | Yoo et al. | |
| 2014/0322522 A1 | 10/2014 | Yoo | |
| 2014/0352879 A1 | 12/2014 | Yoo et al. | |
| 2015/0009009 A1 | 1/2015 | Zarrabi et al. | |
| 2015/0034237 A1 | 2/2015 | Biggs et al. | |
| 2015/0043095 A1 | 2/2015 | Lipton et al. | |
| 2015/0084483 A1 | 3/2015 | Yoo et al. | |
| 2015/0096666 A1 | 4/2015 | Yoo et al. | |

FOREIGN PATENT DOCUMENTS

| | | |
|---|---|---|
| DE | 2535833 A1 | 2/1977 |
| DE | 4408618 A1 | 9/1995 |
| DE | 19636909 C1 | 3/1998 |
| DE | 19952062 A1 | 5/2000 |
| DE | 10058096 A1 | 6/2002 |
| DE | 10161349 A1 | 7/2003 |
| DE | 10335019 A1 | 2/2005 |
| EP | 0196839 A2 | 10/1986 |
| EP | 0295907 A1 | 12/1988 |
| EP | 0522882 A2 | 1/1993 |
| EP | 0833182 A2 | 4/1998 |
| EP | 0980103 A2 | 2/2000 |
| EP | 1050955 A1 | 11/2000 |
| EP | 1090835 A1 | 11/2000 |
| EP | 1481467 A1 | 12/2004 |
| EP | 1512215 A1 | 3/2005 |
| EP | 1528609 A2 | 5/2005 |
| EP | 1602135 A2 | 12/2005 |
| EP | 1698876 A2 | 9/2006 |
| EP | 1751843 A2 | 2/2007 |
| EP | 1843406 A1 | 10/2007 |
| EP | 1976036 A2 | 10/2008 |
| EP | 2119747 B1 | 11/2009 |
| EP | 2511314 A1 | 10/2012 |
| FR | 2745476 A1 | 9/1997 |
| GB | 2338513 A | 12/1999 |
| GB | 2470006 A | 11/2010 |
| JP | S 5181120 A | 7/1976 |
| JP | S 52120840 A | 10/1977 |
| JP | S 5445593 A | 4/1979 |
| JP | S 5542474 A | 3/1980 |
| JP | S 5565569 A | 5/1980 |
| JP | S 5661679 A | 5/1981 |
| JP | S 56101788 A | 8/1981 |
| JP | S 59126689 A | 7/1984 |
| JP | S 6199499 A | 5/1986 |
| JP | S 61239799 A | 10/1986 |
| JP | S 6397100 A | 4/1988 |
| JP | H 02162214 A | 6/1990 |
| JP | 02222019 A | 9/1990 |
| JP | 03173022 A | 7/1991 |
| JP | H 04353279 A | 12/1992 |
| JP | H 05202707 A | 8/1993 |
| JP | H 05244782 A | 9/1993 |
| JP | H 07111785 A | 4/1995 |
| JP | H 07240544 A | 9/1995 |
| JP | H 09275688 A | 10/1997 |
| JP | H 10137655 A | 5/1998 |
| JP | H 10207616 A | 8/1998 |
| JP | H 10321482 A | 12/1998 |
| JP | H 112764 A | 1/1999 |
| JP | 11134109 A | 5/1999 |
| JP | H 11133210 A | 5/1999 |
| JP | 2000-081504 A | 3/2000 |
| JP | 2001-130774 A | 5/2001 |
| JP | 2001-136598 A | 5/2001 |
| JP | 2001-286162 A | 10/2001 |
| JP | 2003-040041 A | 2/2003 |
| JP | 3501216 B2 | 3/2004 |
| JP | 2004-516966 A | 6/2004 |
| JP | 2004-221742 A | 8/2004 |
| JP | 2004-296154 A | 10/2004 |
| JP | 2004-353279 A | 12/2004 |
| JP | 2005-202707 A | 7/2005 |
| JP | 2005-522162 A | 7/2005 |
| JP | 3709723 B2 | 8/2005 |
| JP | 2005-527178 A | 9/2005 |
| JP | 2006-048302 A | 2/2006 |
| JP | 2006-509052 A | 3/2006 |
| JP | 2006-178434 A | 7/2006 |
| JP | 2006-520180 A | 8/2006 |
| JP | 2006-244490 A | 9/2006 |
| JP | 2007-206362 A | 8/2007 |
| JP | 2007-287670 A | 11/2007 |
| JP | 2008-262955 A | 10/2008 |
| JP | 2009-249313 A | 10/2009 |
| JP | 2010-273524 A | 12/2010 |
| JP | 5415442 B2 | 2/2014 |
| KR | 2004-0097921 A | 12/2004 |
| KR | 10-0607839 B1 | 8/2006 |
| KR | 10-0650190 B1 | 11/2006 |
| KR | 2008-0100757 A | 11/2008 |
| KR | 2010-0121801 A | 11/2010 |
| KR | 20110122244 A | 11/2011 |
| WO | WO 87/07218 A1 | 12/1987 |
| WO | WO 89/02658 A1 | 3/1989 |
| WO | WO 94/18433 A1 | 8/1994 |
| WO | WO 95/08905 A1 | 3/1995 |
| WO | WO 96/26364 A2 | 8/1996 |
| WO | WO 97/15876 A1 | 5/1997 |

(56) References Cited

FOREIGN PATENT DOCUMENTS

| | | |
|---|---|---|
| WO | WO 98/19208 A2 | 5/1998 |
| WO | WO 98/35529 A2 | 8/1998 |
| WO | WO 98/45677 A2 | 10/1998 |
| WO | WO 99/17929 A1 | 4/1999 |
| WO | WO 99/23749 A1 | 5/1999 |
| WO | WO 99/37921 A1 | 7/1999 |
| WO | WO 01/01025 A2 | 1/2001 |
| WO | WO 01/06575 A1 | 1/2001 |
| WO | WO 01/06579 A2 | 1/2001 |
| WO | WO 01/58973 A2 | 8/2001 |
| WO | WO 01/59852 A2 | 8/2001 |
| WO | WO 01/91100 A1 | 11/2001 |
| WO | WO 02/27660 A2 | 4/2002 |
| WO | WO 02/37660 A1 | 5/2002 |
| WO | WO 02/37892 A2 | 5/2002 |
| WO | WO 02/071505 A1 | 9/2002 |
| WO | WO 03/056274 A1 | 7/2003 |
| WO | WO 03/056287 A1 | 7/2003 |
| WO | WO 03/081762 A1 | 10/2003 |
| WO | WO 03/107523 A1 | 12/2003 |
| WO | WO 2004/009363 A1 | 1/2004 |
| WO | WO 2004/027970 A1 | 4/2004 |
| WO | WO 2004/053782 A1 | 6/2004 |
| WO | WO 2004/074797 A1 | 9/2004 |
| WO | WO 2004/079832 A2 | 9/2004 |
| WO | WO 2004/086289 A2 | 10/2004 |
| WO | WO 2004/093763 A1 | 11/2004 |
| WO | WO 2005/027161 A2 | 3/2005 |
| WO | WO 2005/053002 A2 | 6/2005 |
| WO | WO 2005/079187 A2 | 9/2005 |
| WO | WO 2005/079353 A2 | 9/2005 |
| WO | WO 2005/081676 A2 | 9/2005 |
| WO | WO 2005/086249 A1 | 9/2005 |
| WO | WO 2006/040532 A1 | 4/2006 |
| WO | WO 2006/102273 A2 | 9/2006 |
| WO | WO 2006/121818 A1 | 11/2006 |
| WO | WO 2006/123317 A2 | 11/2006 |
| WO | WO 2007/029275 A1 | 3/2007 |
| WO | WO 2007/072411 A1 | 6/2007 |
| WO | WO 2008/052559 A2 | 5/2008 |
| WO | WO 2008/105861 A2 | 9/2008 |
| WO | WO 2008/150817 A1 | 12/2008 |
| WO | WO 2009/006318 A1 | 1/2009 |
| WO | WO 2009/076477 A1 | 6/2009 |
| WO | WO 2009/112988 A1 | 9/2009 |
| WO | WO 2010/104953 A1 | 9/2010 |
| WO | WO 2010/115549 A1 | 10/2010 |
| WO | WO 2011/118315 A1 | 9/2011 |
| WO | WO 2012/044419 A1 | 4/2012 |
| WO | WO 2012/099854 A1 | 7/2012 |
| WO | WO 2012/118916 A2 | 9/2012 |
| WO | WO 2012/148644 A2 | 11/2012 |
| WO | WO 2013/055733 A1 | 4/2013 |
| WO | WO 2013/103470 A1 | 7/2013 |
| WO | WO 2013/142552 A1 | 9/2013 |
| WO | WO 2013/155377 A1 | 10/2013 |
| WO | WO 2013/192143 A1 | 12/2013 |
| WO | WO 2014/028819 A1 | 2/2014 |
| WO | WO 2014/028822 A1 | 2/2014 |
| WO | WO 2014/028825 A1 | 2/2014 |
| WO | WO 2014/062776 A1 | 4/2014 |
| WO | WO 2014/066576 A1 | 5/2014 |
| WO | WO 2014/074554 A2 | 5/2014 |
| WO | WO 2014/089388 A2 | 6/2014 |
| WO | WO 2014/187976 A1 | 11/2014 |
| WO | WO 2015/051291 A1 | 4/2015 |

OTHER PUBLICATIONS

Ajluni, Cheryl, "Pressure Sensors Strive to Stay on Top, New Silicon Micromachining Techniques and Designs Promise Higher Performance," Electronic Design—Advanced Technology Series, Oct. 3, 1994, pp. 67-74.

Akle, Barbar J., et al., "Ionic Electroactive Hybrid Transducers," Smart Structures and Materials 2005: Electroactive Polymer Actuators and Devices (EAPAD), Proceedings of SPIE, Bellingham, WA, vol. 5759, 2005, pp. 153-164.

Anderson, R.A., "Mechanical Stress in a Delectric Solid From a Uniform Electric Field," The American Physical Society, 1986, pp. 1302-1307.

Aramaki, S., S. Kaneko, K. Arai, Y. Takahashi, H. Adachi, and K. Yanagisawa. 1995. "Tube Type Micro Manipulator Using Shape Memory Alloy (SMA)," Proceedings of the IEEE Sixth International Symposium on Micro Machine and Human Science, Nagoya, Japan, pp. 115-120.

Ashley, S., "Artificial Muscles", Scientific American 2003, pp. 53-59.

Ashley, S., "Smart Skis and Other Adaptive Structures," Mechanical Engineering, Nov. 1995, pp. 77-81.

Bar-Cohen, Yoseph, JPL, WorldWide ElectroActive Polymer Actuators Webhub webpages 1-7, http://ndeaa.jpl.nasa.gov/nasa-nde/lommas/eap/EAP-web.htm, downloaded Jul. 23, 2001 (7 pages).

Bar-Cohen, Yoseph, JPL, WorldWide ElectroActive Polymers, EAP (Artifical Muscles) Newsletter, vol. 1, No. 1, Jun. 1999.

Bar-Cohen, Yoseph, JPL, WorldWide ElectroActive Polymers, EAP (Artifical Muscles) Newsletter, vol. 1, No. 2, Dec. 1999.

Bar-Cohen, Yoseph, JPL, WorldWide ElectroActive Polymers, EAP (Artifical Muscles) Newsletter, vol. 2, No. 1, Jul. 2000.

Bar-Cohen, Yoseph, JPL, WorldWide ElectroActive Polymers, EAP (Artifical Muscles) Newsletter, vol. 2, No. 2, Dec. 2000.

Bar-Cohen, Yoseph, JPL, WorldWide ElectroActive Polymers, EAP (Artifical Muscles) Newsletter, vol. 3, No. 1, Jun. 2001.

Baughman, R., L. Shacklette, R. Elsenbaumer, E. Plichta, and C. Becht "Conducting Polymer Electromechanical Actuators," Conjugated Polymeric Materials: Opportunities in Electronics, Optoelectronics and Molecular Electronics, eds. J.L. Bredas and R.R. Chance, Kluwer Academic Publishers, The Netherlands, pp. 559-582, 1990.

Baughman, R.H., L.W. Shacklette, R.L. Elsenbaumer, E.J. Plichta, and C. Becht "Micro electromechanical actuators based on conducting polymers," in Molecular Electronics, Materials and Methods, P.I. Lazarev (ed.), Kluwer Academic Publishers, pp. 267-289 (1991).

Beckett, J., "New Robotics Tap the Mind, Help the Heart, SRI shows of latest technologies," San Francisco Chronicle, Aug. 27, 1998.

Begley, M. et al., "The Electro-Mechanical Response to Highly Compliant Substrates and Thin Stiff Films with Periodic Cracks," International Journal of Solids and Structures, 42:5259-5273, 2005.

Benslimane, M and P. Gravesen, "Mechanical Properties of Dielectric Elastomer Actuators with Smart Metallic Compliant Electrodes," Proceedings of SPIE, International Society for Optical Engineering, vol. 4695, Jan. 1, 2002, pp. 150-157.

Bharti, V., H.S. Xu, G. Shanthi and Q.M. Zhang, "Polarization and Structural Properties of High Energy Electron Irradiated Poly(vinylidene fluoride-trifluoroethylene) Copolymer Films," to be published in J. Appl. Phys. (2000).

Bharti, V., Y. Ye, T.-B. Xu and Q.M. Zhang, "Correlation Between Large Electrostrictive Strain and Relaxor Behavior with Structural Changes Induced in P(VDF-TrFE) Copolymer by Electron Irradiation," Mat. Res. Soc. Symp. Proc. vol. 541, pp. 653-659 (1999).

Bharti, V., Z.-Y.Cheng S. Gross, T.-B. Xu and Q.M. Zhang, "High Electrostrictive Strain Under High Mechanical Stress in Electron-Irradiated Poly(vinylidene fluoride-trifluoroethylene) Copolymer," Applied Physics Letters, vol. 75, No. 17, pp. 2653-2655 (Oct. 25, 1999).

Bharti, V.,X.-Z. Zhao, Q.M. Zhang, T. Romotowski, F. Tito, and R. Ting, "Ultrahigh Field Induced Strain and Polarization Response in Electron Irradiated Poly(Vinylidene Fluoride-Trifluoroethylene) Copolymer,"Mat. Res. Innovat. vol. 2, pp. 57-63 (1998).

Bobbio, S., M. Kellam, B. Dudley, S. Goodwin Johansson, S. Jones, J. Jacobson, F. Tranjan, and T. DuBois, "Integrated Force Arrays," in Proc. IEEE Micro Electro Mechanical Systems Workshop, Fort Lauderdale, Florida, Feb. 7-10, 1993, pp. 146-154.

Bohon, K. and S. Krause, "An Electrorheological Fluid and Siloxane Gel Based Electromechanical Actuator: Working Toward an Artificial Muscle," to be published in J. Polymer Sci., Part B. Polymer Phys. (2000).

(56) References Cited

OTHER PUBLICATIONS

Boyle, W. et al., "Departure from Paschen's Law of Breakdown in Gases," The Physical Review, Second Series, 97(2): 255-259, Jan. 15, 1955.

Brock, D.L., "Review of Artifical Muscle based on Contractile Polymers," MIT Artificial Intelligence Laboratory, A.I. Memo No. 1330, Nov. 1991.

Caldwell, D., G. Medrano-Cerda, and M. Goodwin, "Characteristics and Adaptive Control of Pneumatic Muscle Actuators for a Robotic Elbow," Proc. IEEE Int. Conference on Robotics and Automation, San Diego, California (May 8-13, 1994).

Calvert, P. and Z. Liu, "Electrically Stimulated Bilayer Hydrogels as Muscles," Proceedings of the SPIE International Symposium on Smart Structures and Materials: Electro-Active Plymer Actuators and Devices, Mar. 1-2, 1999, Newport Beach, California, USA, pp. 236-241.

Chen et al., "Active control of low-frequency sound radiation from vibrating panel using planar sound sources," Journal of Vibration and Acoustics, vol. 124, pp. 2-9, Jan. 2002.

Chen, Zheng et al., "Quasi-Static Positioning of Ionic Polymer-Metal Composite (IPMC) Actuators," Proceedings of the 2005 IEEE/ASME International Conference on Advanced Intelligent Mechatronics, Monterey, California, Jul. 24-28, 2005, pp. 60-65.

Cheng, Z.-Y., H.S. Xu, J. Su, Q. M. Zhjang, P.-C. Wang and A.G. MacDiarmid, "High Performance of All-Polymer Electrostrictive Systems," Proceedings of the SPIE Ineternational Symposium on Smart Structures and Materials: Electro-Active Polymer Actuators and Devices, Mar. 1-2, 1999, Newport Beach, California, USA, pp. 140-148.

Cheng, Z.-Y., T.-B. Xu, V. Bharti, S. Wang, and Q.M. Zhang, "Transverse Strain Responses in the Electrostrictive Poly(Vinylidene Fluoride-Trifluorethylene) Copolymer," Appl. Phs. Lett. vol. 74, No. 13, pp. 1901-1903, Mar. 29, 1999.

Chiarelli, P., A. Della Santa, D. DeRossi, and A. Mazzoldi, "Actuation Properties of Electrochemically Driven Polypyrrole Free-Standing Films," Journal of Intelligent Material Systems and Structures, vol. 6, pp. 32-37, Jan. 1995.

De Rossi, D., and P. Chiarelli, "Biomimetic Macromolecular Actuators," Macro-Ion Characterization, American Chemical Society Symposium Series, vol. 548, Ch. 40, pp. 517-530 (1994).

Delille, R. et al., "Novel Compliant Electrodes Based on Platinum Salt Reduction," Smart Structures and Materials 2006: Electroactive Polymer Actuators and Devices (EAPAD), edited by Yoseph Bar-Cohen, Proceedings of SPIE, 6168 (6168Q), 2006.

Dowling, K., Beyond Faraday-NonTraditional Actuation, available on the World Wide Web at http://www.frc.ri.cmu.edu/~nivek/OTH/beyond-faraday/beyondfaraday.html, 9 pages, 1994.

Egawa, S. and T. Higuchi, "Multi-Layered Electrostatic Film Actuator," Proc. IEEE Micro Electra Mechanical Systems, Napa Valley, California, pp. 166-171 (Feb. 11-14, 1990).

Elhami, K. B. Gauthier-Manuel, "Electrostriction of the Copolymer of Vinylidene-Fluoride and Trifluoroethylene," J. Appl. Phys. vol. 77 (8), 3987-3990, Apr. 15, 1995.

Flynn, Anita M., L.S. Tavrow, S.F. Bart, R.A. Brooks, D.J. Ehrlich, Kr.R. Udayakumar, and L.E. Cross. 1992. "Piezoelectric Micromotors for Microrobots," IEEE Journal of Microelectromechanical Systems, vol. 1, No. 1, pp. 44-51 (Mar. 1992); also published as MIT AI Laboratory Memo 1269, Massachusetts Institute of Technology (Feb. 1991).

Ford, V. and J. Kievet, "Technical Support Package on Traveling-Wave Rotary Actuators", NASA Tech Brief, vol. 21, No. 10, Item #145, from JPL New Technology Report NPO-19261, Oct. 1997.

Full, R.J. and K. Meijer, "Artificial Muscles Versus Natural Actuators from Frogs to Flies," Proceedings of the 7th SPIE Symposium on Smart Structures and Materials-Electroactive Polymers and Devices (EAPAD) Conference, Mar. 6-8, 2000, Newport Beach, California, USA, pp. 2-9.

Furuhata, T., T. Hirano, and H. Fujita, "Array-Driven Ultrasonic Microactuators," Solid State Sensors and Actuators, 1991, Digest of Tech. Papers, Transducers, pp. 1056-1059.

Furukawa, T. and N. Seo, "Electrostriction as the Origin of Piezoelectricity in Ferroelectric Polymers," Japanese J. Applied Physics, vol. 29, No. 4, pp. 675-680 (Apr. 1990).

Ghaffarian, S.R., et al., "Electrode Structures in High Strain Actuator Technology," Journal of Optoelectronics and Advanced Materials, Nov. 2007, 9(11), pp. 3585-3591.

Gilbertson, R.G. and J.D. Busch. "Survey of MicroActuator Technologies for Future Spacecraft Missions," presented a the conference entitled "Practical Robotic Interstellar Flight: Are We Ready?" New York University and The United Nations, New York. (Aug. 29 and Sep. 1, 1994); also published on the World Wide Web at http://nonothinc.com/nanosci/microtech/mems/ten-actuators/gilbertson.html.

Goldberg, Lee, "Adaptive-Filtering Developments Extend Noise-Cancellation Applications," Electronic Design, Feb. 6, 1995, pp. 34 and 36.

Greene, M. J.A. Willett, and R. Kornbluh, "Robotic Systems," in ONR Report 32198-2, Ocean Engineering and Marine Systems 1997 Program (Dec. 1997).

Greenland, P. Allegro Microsystems Inc., and B. Carsten, Bruce Carsten Associates, "Stacked Flyback Converters Allow Lower Voltage MOSFETs for High AC Line Voltage Operation," Feature PCIM Article, PCIM, Mar. 2000.

Hansen, G., "High Aspect Ratio Sub-Micron and Nano-Scale Metal Filaments," SAMPE Journal, 41(2): 24-33, 2005.

Heydt, R., R. Kornbluh, R. Pelrine, and B. Mason, "Design and Performance of an Electrostrictive Polymer Film Acoustic Actuator," Journal of Sound and Vibration (1998) 215(2), 297-311.

Heydt, R., R. Pelrine, J. Joseph, J. Eckerle, and R. Kornbluh, "Acoustical Performance of an Electrostrictive Polymer Film Loudspeaker," Journal of the Acoustical Society of America, vol. 107(2), pp. 833-839 (Feb. 2000).

Hirano, M., K. Yanagisawa, H. Kuwano, and S. Nakano, "Microvalve with Ultra-Low Leakage," Tenth Annual International Workshop on Micro Electromechanical Systems, Nagoya, Japan, IEEE Proceedings (Jan. 26-30, 1997), pp. 323-326.

Hirose, S., Biologically Inspired Robots: Snake-like Locomotors and Manipulators, "Development of the ACM as a Manipulator," Oxford University Press, New York, 1993, pp. 170-172.

http://www.neurosupplies.com/pdf_files/transducers.pdf, printed from web Jul. 25, 2001.

Huang, Cheng et al., "Colossal Dielectric and Electromechanical Responses in Self-Assembled Polymeric Nanocomposites", Applied Physics Letters 87, 182901 (2005), pp. 182901-1 through 182901-3.

Hunter, I., S. Lafontaine, J. Hollerbach, and P. Hunter, "Fast Reversible NiTi Fibers for Use in MicroRobotics," Proc. 1991 IEEE Micro Electro Mechanical Systems-MEMS '91, Nara, Japan, pp. 166-170.

Hunter, I.W. and S. Lafontaine, "A Comparison of Muscle with Artificial Actuators," Technical Digest of the IEEE Solid-State Sensor and Actuator Workshop, Hilton Head, South Carolina, Jun. 22-25, 1992, pp. 178-185.

Jacobsen, S., R. Price, J. Wood, T. Rytting and M. Rafaelof, "A Design Overview of an Eccentric-Motion Electrostatic Microactuator (the Wobble Motor)", Sensors and Actuators, 20 (1989) pp. 1-16.

Joseph, J., R. Pelrine, J. Eckerle, J. Bashkin, and P. Mulgaonkar, "Micro Electrical Composite Sensor", SRI International, printed from web Jul. 25, 2001.

Kaneto, K., M. Kaneko, Y. Min, and A.G. MacDiarmid, "Artifical Muscle: Electromechanical Actuators Using Polyaniline Films," Synthetic Metals 71, pp. 2211-2212, 1995.

Kawamura, S., K. Minani, and M. Esashi, "Fundamental Research of Distributed Electrostatic Micro Actuator," Technical Digest of the 11th Sensor Symposium, pp. 27-30 (1992).

Khuri-Yakub et al., "Silicon micromachined ultrasonic transducers," Japan Journal of Applied Physics, vol. 39 (2000), pp. 2883-2887, Par 1, No. 5B, May 2000.

Kinsler et al., Fundamentals of Acoustics, Third Edition, John Wiley and Sons, 1982.

Kondoh, Y., and T. Ono. 1991. "Bimorph Type Actuators using Lead Zinc Niobate-based Ceramics," Japanese Journal of Applied Physics, vol. 30, No. 9B, pp. 2260-2263, Sep. 1991.

(56) References Cited

OTHER PUBLICATIONS

Kornbluh et al., "Electrostrictive Polymer Artificial Muscle Actuators," May 1998, Proc. of the 1998 IEEE Conf. on Robotics & Automation, 2147-2154.

Kornbluh et al., "Medical Applications of New Electroactive Polymer Artificial Muscles," SRI International, Menlo Park, CA, JSPP, v. 16, 2004.

Kornbluh, R. "Presentation to Medtronic", Jan. 2000.

Kornbluh, R. D and R. E. Pelrine., "Dexterous Multiarticulated Manipulator with Electrostrictive Polymer Artificial Muscle," ITAD-7247-QR-96-175, SRI Project No. 7247, Prepared for Office of Naval Research, Nov. 1996.

Kornbluh, R. et al., "Electroactive polymers: An emerging technology for MEMS," (invited) in MEMS/MOEMS Components and Their Applications, eds. S. Janson, W. Siegfried, and A. Henning, Proc. SPIE, 5344:13-27, 2004.

Kornbluh, R. et al., "Electroelastomers: Applications of dielectric elastomer transducers for actuation, generation and smart structures," Smart Structures and Materials 2002: Industrial and Commercial Applications of Smart Structures Technologies, ed., A. McGowan, Proc. SPIE, 4698:254-270, 2002.

Kornbluh, R. et al., "Shape control of large lightweight mirrors with dielectric elastomer actuation," Actuation Smart Structures and Materials 2003: Electroactive Polymer Actuators and Devices, ed. Y. Bar-Cohen, Proc. SPIE, 5051, 2003.

Kornbluh, R., "Presentation to Colin Corporation", Jan. 1997.

Kornbluh, R., "Use of Artificial Muscle Butterfly for Chronicle Newpaper Photograph," Aug. 1998.

Kornbluh, R., G. Andeen, and J. Eckerle, "Artificial Muscle: The Next Generation of Robotic Actuators," presented at the Fourth World Conference on Robotics Research, SME Paper M591-331, Pittsburgh, PA, Sep. 17-19, 1991.

Kornbluh, R., Pelrine, R. Joseph, J., Pei, Q. and Chiba., "Ultra-High Strain Response of Elastomeric Polymer Dielectrics", Proc. Materials Res. Soc., Fall meeting, Boston, MA, pp. 1-12, Dec. 1999.

Kornbluh, R., Pelrine, R., Eckerie, J., Joseph, J., "Electrostrictive Polymer Artificial Muscle Actuators," IEEE International Conference on Robotic and Automation, Leuven, Belgium, 1998.

Kornbluh, R., R. Pelrine, J. Joseph, "Elastomeric Dielectric Artificial Muscle Actuators for Small Robots," Proceedings of the Third IASTED International Conference on Robotics and Manufacturing, Jun. 14-16, 1995, Cancun, Mexico.

Kornbluh, R., R. Pelrine, Jose Joseph, Richard Heydt, Qibing Pei, Seiki Chiba, 1999. "High-Field Electrostriction of Elastomeric Polymer Dielectrics for Actuation", Proceedings of the SPIE International Symposium on Smart Structures and Materials: Electro-Active Polymer Actuators and Devices, Mar. 1-2, 1999, Newport Beach, California, USA. pp. 149-161.

Kornbluh, R., R. Pelrine, Q. Pei, S. Oh, and J. Joseph, 2000. "Ultrahigh Strain Response of Field-Actuated Elastomeric Polymers," Proceedings of the 7th SPIE Symposium on Smart Structures and Materials-Electroactive Polymers and Devices (EAPAD) Conference, Mar. 6-8, 2000, Newport Beach, California, USA, pp. 51-64.

Kornbluh, R., R. Pelrine, R. Heydt, and Q. Pei, "Acoustic Actuators Based on the Field-Activated Deformation of Dielectric Elastomers," (2000).

Kornbluh, Roy D., Robotic Systems, Ocean Engineering and Marine Systems, 1997 Program, Dec. 1997, Office of Naval Research Public Release, ONR-32198-2.

Kornbluh, Roy D., Robotic Systems, Ocean Engineering and Marine Systems, 1998 Program, Feb. 1999, Office of Naval Research Public Release, ONR-32199-4.

Kornbluh, Roy D., Robotic Systems, Ocean Engineering and Marine Systems, 1999 Program, Feb. 2000, Office of Naval Research Public Release, ONR-32100-2.

Kornbluh, Roy D., Robotic Systems, Ocean Engineering and Marine Systems, 2000 Program, Jan. 2001, Office of Naval Research Public Release, ONR-32100-1.

Ktech's PVDF Sensors, http://www.ktech.com/pvdf.htm, Jun. 6, 2001, pp. 1-5.

Kymissis et al., "Parasitic Power Harvesting in Shoes," XP-010312825—Abstract, Physics and Media Group, MIT Media Laboratory E15-410, Cambridge, MA, Oct. 19, 1998, pp. 132-139.

Lacour, S. et al., "Mechanisms of Reversible Stretchability of Thin Metal Films on Elastomeric Substrates, " Applied Physics Letters 88, 204103, 2006.

Lacour, S. et al., "Stretchable Interconnects for Elastic Electronic Surfaces," Proceedings of the IEEE on Flexible Electronics Technology, 93(8): 1459-1467, 2005.

Lakes, R.S., "Extreme damping in compliant composites with a negative stiffness phase" or "Extreme Damping in Composite Materials with a Negative Stiffness Phase", Physical Review Letters, 86, 2897-2900, Mar. 26 (2001).

Lakes, R.S., "Extreme damping in compliant composites with a negative stiffness phase" or "Extreme Damping in Composite Materials with Negative Stiffness Inclusions", Nature, 410, 565-567, Mar. (2001).

Lakes, R.S., "Extreme damping in compliant composites with a negative stiffness phase", Philosophical Magazine Letters, 81, 95-100 (2001).

Lang, J, M. Schlect, and R. Howe, "Electric Micromotors: Electromechanical Characteristics," Proc. IEEE Micro Robots and Teleoperators Workshop, Hyannis, Massachusetts (Nov. 9-11, 1987).

Lawless, W. and R. Arenz, "Miniature Solid-state Gas Compressor," Rev. Sci Instrum., 58(8), pp. 1487-1493, Aug. 1987.

Liu, C. & Y. Bar-Cohen, "Scaling Laws of Microactuators and Potential Aplications of Elecroactive Polymers in MEMS", SPIE, Conference on Electroactive Polymer Actuators and Devices, Newport Beach, CA Mar. 1999.

Liu, C., Y. Bar-Cohen, and S. Leary, "Electro-statically stricted polymers (ESSP)," Proceedings of the SPIE International Symposium on Smart Structures and Materials: Electro-Active Polymer Actuators and Devices, Mar. 1-2, 1999, Newport Beach, California, USA., pp. 186-190.

Liu, Y., T. Zeng, Y.X. Wang, H. Yu, and R. Claus, "Self-Assembled Flexible Electrodes on Electroactive Polymer Actuators," Proceedings of the SPIE International Symposium on Smart Structures and Materials: Electro-Active Polymer Actuators and Devices, Mar. 1-2, 1999, Newport Beach, California, USA., pp. 284-288.

Madden et al., "Conducting polymer actuators as engineering materials," SPIE: Smart Materials and Structures, ed. Yoseph Bar-Cohen, Bellingham, WA, pp. 176-190, Pub 2002.

Madden, J.D. et al., "Fast contracting polypyrrole actuators", Jan. 6, 2000, Elsevier Science S.A., pp. 185-192.

Martin, J. and R. Anderson, 1999. "Electrostriction in Field-Structured Composites: Basis for A Fast Artificial Muscle?", The Journal of Chemical Physics, vol. 111, No. 9, pp. 4273-4280, Sep. 1, 1999.

Measurements Specialties, Inc.-Piezo Home, http://www.msiusa.com/piezo/index.htm, Jun. 6, 2001.

Möller, S. et al., A Polymer/semiconductor write-once read-many-times memory, Nature, vol. 26, Nov. 13, 2003, pp. 166-169, Nature Publishing Group.

Nguyen, T., Green, M., and Kornbluh, R., "Robotic Systems," in ONR Ocean, Atmosphere, and Space Fiscal Year 1999 Annual Reports (Dec. 1999).

Nguyen, T., J. A. Willett and Kornbluh, R., "Robotic systems," in ONR Ocean, Atmosphere, and Space Fiscal Year 1998 Annual Reports (Dec. 1998).

Nguyen, T.B., C.K. DeBolt, S.V. Shastri and A. Mann, "Advanced Robotic Search," in ONR Ocean, Atmosphere, and Space Fiscal Year 1999 Annual Reports (Dec. 1999).

Nihon Kohden Corporation, Operators Manual, available Oct. 1, 2001.

NXT plc, Huntingdon, UK (www.nxtsound.com) Sep. 17, 2008.

Ohara, K., M. Hennecke, and J. Fuhrmann, "Electrostriction of polymethylmethacrylates," Colloid & Polymer Sci. vol. 280, 164-168 (1982).

Olsson, A., G. Stemme, and E. Stemme, "The First Valve-less Diffuser Gas Pump," Tenth Annual International Workshop on Micro Electromechanical Systems, Nagoya, Japan, IEEE Proceedings (Jan. 26-30, 1997), pp. 108-113.

Olsson, A., O. Larsson, J. Holm, L. Lundbladh, O. Ohinan, and G. Stemme. 1997. "Valve-less Diffuser Micropumps Fabricated using

(56) References Cited

OTHER PUBLICATIONS

Thermoplastic Replication," Proc. IEEE Micro Electro Mechanical Systems, Nagoya, Japan, pp. 305-310 (Jan. 26-30, 1997).

Osterbacka, R. et al., "Two-Dimensional Electronic Excitations in Self-Assembled Conjugated Polymer Nanocrystals," Science, vol. 287:839-842, Feb. 4 2000.

Otero, T.F., J. Rodriguez, and C. Santamaria, "Smart Muscle Under Electrochemical Control of Molecular Movement in Polypyrrole Films," Materials Research Society Symposium Proceedings, vol. 330, pp. 333-338, 1994.

Otero, T.F., J. Rodriguez, E. Angulo and C. Santamaria, "Artificial Muscles from Bilayer Structures," Synthetic Metals, vol. 55-57, pp. 3713-3717 (1993).

Park, S.E., and T. Shrout., "Ultrahigh Strain and Piezoelectric Behavior in Relaxor Based Ferroelectric Single Crystals," J. Appl. Phys., vol. 82, No. 4, pp. 1804-1811, Aug. 15, 1997.

Pei et al., "Electrochemical Applications of the Bending Beam Method. 1. Mass Transport and Volume Changes in Polypyrrole During Redox," J. Phys. Chem., 1992, 96, pp. 10507-10514.

Pei, Q. et al., "Multifunctional Electroelastomer Roll Actuators and Their Application for Biomimetic Walking Robots," Smart Structures and Materials 2003. Electroactive Polymer Actuators and Devices, San Diego, CA, USA, Mar. 3-6, 2003, vol. 5051, 2003, pp. 281-290, XP002291729, Proceedings of the SPIE, ISSN: 0277-786X, the whole document.

Pei, Q. et al., "Multifunctional Electroelastomer Rolls," Mat. Res. Soc. Symp. Proc., vol. 698, Nov. 26-30, 2001, Boston, MA, pp. 165-170.

Pei, Q. et al., "Recent Progress on Electroelastomer Artificial Muscles and Their Application for Biomimetic Robots", SPIE, Pub. Jun. 2004, 11 pages.

Pei, Q., O. Inganäs, and I. Lundström, "Bending Bilayer Strips Built From Polyaniline for Artificial Electrochemical Muscles," Smart Materials and Structures, vol. 2, pp. 1-6., Jan. 22, 1993.

Pei, Q., Pelrine, R., Kornbluh, R., Jonasdottir, S., Shastri, V., Full, R., "Multifunctional Electroelastomers: Electroactive Polymers Combining Structural, Actuating, and Sensing Functions," ITAD-433-PA-00-123, University of California at Berkeley, Berkeley, CA, available at www.sri.com-publications, Jan. 17, 2001.

Pei, Qibing "Description of Conference Demonstration" Mar. 2001.

Pelrine et al., "Electrostrictive Polymer Artificial Muscle Actuators," May 1998, Proc. of the 1998 IEEE Conf. On Robotics & Automation, 2147-2154.

Pelrine, R. and Kornbluh, R., and. 1995. "Dexterous Multiarticulated Manipulator with Electrostrictive Polymer Artificial Muscle Actuator," EMU 95-023, SRI International, Menlo Park, California, Apr. 28, 1995.

Pelrine, R. et al., "Applications of dielectric elastomer actuators," (invited paper) in Smart Structures and Materials 2001: Electroactive Polymer Actuators and Devices, ed., Y. Bar Cohen, Proc. SPIE, 4329:335-349, 2001.

Pelrine, R., R. Kornbluh, and G. Kofod, "High Strain Actuator Materials Based on Dielectric Elastomers," submitted to Advanced Materials (May 2000).

Pelrine, R., R. Kornbluh, and J. Joseph, "Electrostriction of Polymer Dielectrics with Compliant Electrodes as a Means of Actuation," Sensors and Actuators A: Physical, vol. 64, No. 1, 1998, pp. 77-85.

Pelrine, R., R. Kornbluh, and J. Joseph, FY 1992 Final Report on Artifical Muscle for Small Robots, ITAD-3393-FR-93-063, SRI International, Menlo Park, California, Mar. 1993.

Pelrine, R., R. Kornbluh, and J. Joseph, FY 1993 Final Report on Artifical Muscle for Small Robots, ITAD-4570-FR-94-076, SRI International, Menlo Park, California, 1994.

Pelrine, R., R. Kornbluh, and J. Joseph, FY 1994 Final Report on Artifical Muscle for Small Robots, ITAD-5782-FR-95-050, SRI International, Menlo Park, California, 1995.

Pelrine, R., R. Kornbluh, and J. Joseph, FY 1995 Final Report on Artifical Muscle for Small Robots, ITAD-7071-FR-96-047, SRI International, Menlo Park, California, 1996.

Pelrine, R., R. Kornbluh, and J. Joseph, FY 1996 Final Report on Artifical Muscle for Small Robots, ITAD-7228-FR-97-058, SRI International, Menlo Park, California, 1997.

Pelrine, R., R. Kornbluh, and J. Joseph, FY 1997 Final Report on Artifical Muscle for Small Robots, ITAD-1612-FR-98-041, SRI International, Menlo Park, California, 1998.

Pelrine, R., R. Kornbluh, and J. Joseph, FY 1998 Final Report on Artifical Muscle for Small Robots, ITAD-3482-FR-99-36, SRI International, Menlo Park, California, 1999.

Pelrine, R., R. Kornbluh, and J. Joseph, FY 1999 Final Report on Artifical Muscle for Small Robots, ITAD-10162-FR-00-27, SRI International, Menlo Park, California, 2000.

Pelrine, R., R. Kornbluh, J. Joseph and S. Chiba, "Electrostriction of Polymer Films for Microactuators," Proc. IEEE Tenth Annual International Workshop on Micro Electro Mechanical Systems, Nagoya, Japan, Jan. 26-30, 1997, pp. 238-243.

Pelrine, R., R. Kornbluh, J. Joseph and S. Chiba, "Review of Artificial Muscle Approaches," invited paper, in Proc. Third International Symposium on Micro Machine and Human Science, Nagoya, Japan, Oct. 14-16, 1992.

Pelrine, R., R. Kornbluh, Q. Pei, and J. Joseph, "High Speed Electrically Actuated Elastomers with Over 100% Strain," Science, vol. 287, No. 5454, pp. 1-21, 2000.

Pelrine, R., R. Kornbluh, Q. Pei, and J. Joseph. "High-Speed Electrically Actuated Elastomers with Strain Greater Than 100%", Science, Reprint Series, Feb. 4, 2000, vol. 287, pp. 836-839.

Pelrine, R., Roy Kornbluh, Jose Joseph, Qibing Pei, Seiki Chiba "Recent Progress in Artificial Muscle Micro Actuators," SRI Interational, Tokyo, 1999 MITI/NEEDOIMNIC, 1999.

Piezoflex(TM) PVDF Polymer Sensors, http://www.airmar.com/piezo/pvdf.htm. Jun. 6, 2001.

PowerLab ADInstruments, MLT001 High-Sensitivity Force Transducers, AD Instruments Transducers Series, printed from web Jul. 25, 2001.

Puers et al, "A Capacitive Pressure Sensor with Low Impedance Output and Active Suppression of Parasitic Effects," Sensors and Actuators, A21-A23 (1990) 108-114.

Puers, Robert, "Capacitive sensors: when and how to use them," Sensors and Actuators A, 37-38 (1993) 93-105.

Reed, C. et al., "The Fundamentals of Aging HV Polymer-Film Capacitors, " IEEE Transactions on Dielectrics and Electrical Insulation, 1(5): 904-922, 1994.

"The Rubbery Ruler", http://www.ph.unimelb.edu.au, printed from web Jul. 25, 2001.

Sakarya, S., "Micromachining Techniques for Fabrication of Integrated Light Modulting Devices", Netherlands 2003, pp. 1-133.

Scheinbeim, J., B. Newman, Z. MA, and J. Lee, "Electrostrictive Response of Elastomeric Polymers," ACS Polymer Preprints, 33(2), pp. 385-386, 1992.

Schlaberg, H. I., and J. S. Duffy, "Piezoelectric Polymer Composite Arrays for Ultrasonic Medical Imaging Applications," Sensors and Actuators, A 44, pp. 111-117, Feb. 22, 1994.

Shahinpoor, M., "Micro-electro-mechanics of Ionic Polymer Gels as Electrically Controllable Artificial Muscles," J. Intelligent Material Systems and Structures, vol. 6, pp. 307-314, May 1995.

Shkel, Y. and D. Klingenberg, "Material Parameters for Electrostriction," J. Applied Physics, vol. 80(8), pp. 4566-4572, Oct. 15, 1996.

Smela, E., O. Inganas, and I. Lundstrom, "Controlled Folding of Micrometer-size Structures," Science, vol. 268, pp. 1735-1738 (Jun. 23, 1995).

Smela, E., O. Inganas, Q. Pei and I. Lundstrom, "Electrochemical Muscles: Micromachinging Fingers and Corkscrews," Advanced Materials, vol. 5, No. 9, pp. 630-632, Sep. 1993.

Smith, S. et al., A low switching voltage organic-on-inorganic heterojunction memory element utilizing a conductive polymer fuse on a doped silicon substrate, Applied Physics Letters, vol. 84, No. 24, May 28, 2004, pp. 5019-5021.

Sokolova, M. et al., "Influence of a Bias Voltage on the Characteristics of Surface Discharges in Dry Air," Plasma Processes and Polymers, 2: 162-169, 2005.

Sommer-Larsen, P. and A. Ladegaard Larsen, "Materials for Dielectric Elastomer Actuators," SPIE, vol. 5385, Mar. 1, 2004, pp. 68-77.

(56) References Cited

OTHER PUBLICATIONS

Standard Test Methods for Rubber Deterioration—Cracking in an Ozone Controlled Environment, ASTM International, D 1149-07.
Su, J, Z. Ounaies, J.S. Harrison, Y. Bara-Cohen and S. Leary, "Electromechanically Active Polymer Blends for Actuation," Proceedings of 7th SPIE Symposium on Smart Structures and Materials-Electroactive Polymers and Devices (EAPAD) Conference, Mar. 6-8, 2000, Newport Beach, CA, USA, pp. 65-72.
Su, J., Q.M. Zhang, C.H. Kim, R.Y. Ting and R. Capps, "Effects of Transitional Phenomena on the Electric Field induced Strain-electrostrictive Response of a Segmented Polyurethane elastomer," pp. 1363-1370, Jan. 20, 1997.
Suzuki et al., "Sound radiation from convex and concave domes in infinite baffle," Journal of the Acoustical Society of America, vol. 69(2), Jan. 1981.
Technology, http://www.micromuscle.com/html/technology.html, Jun. 6, 2001.
Tobushi, H., S. Hayashi, and S. Kojima, "Mechanical Properties of Shape Memory Polymer of Polyurethane Series," in JSME International Journal, Series I, vol. 35, No. 3, 1992.
Todorov et al, "WWWeb Application for Ferropiezoelectric Ceramic Parameters Calculation", Proceedings 24th International Conference on Microelectronics, vol. 1, May 2004, pp. 507-510.
Treloar, L.R.G., "Mechanics of Rubber Elasticity," J Polymer Science, Polymer Symposium, No. 48, pp. 107-123, 1974.
Uchino, K. 1986. "Electrostrictive Actuators: Materials and Applicaions," Ceramic Bulletin, 65(4), pp. 647-652, 1986.
Unger et al. (2000), "Monolithic Microfabricated Valves and Pumps by Multilayer Soft Lithography," Science 288:113-116, no month.
Wade, Jr., W.L., R.J. Mannone and M. Binder, "Increased Dielectric Breakdown Strengths of Melt-Extruded Polyporphlene Films," Polymer vol. 34, No. 5, pp. 1093-1094 (1993).
Wax, S.G. and R.R. Sands, "Electroactive Polymer Actuators and Devices," Proceedings of the SPIE International Symposium on Smart Structures and Materials: Electro-Active Polymer Actuators and Devices, Mar. 1-2, 1999, Newport Beach, CA, USA, pp. 2-10.
Whitesides et al. (2001), "Flexible Methods for Microfluidics," Physics Today 52(6):42-47, no month.
Winters, J., "Muscle as an Actuator for Intelligent Robots," Robotics Research: Trans. Robotics International of SME, Scottsdale, AZ (Aug. 18-21, 1986).
Woodard, Improvements of ModalMax High-Fidelity Peizoelectric Audio Device (LAR-16321-1), NASA Tech Briefs, May 2005, p. 36.
Xia, Younan et al., "Triangular Nanoplates of Silver: Synthesis, Characterization, and Use as Sacrificial Templates for Generating Triangular Nanorings of Gold," Adv. Mater., 2003, 15, No. 9, pp. 695-699.
Yam, P., "Plastics Get Wired," Scientific American, vol. 273, pp. 82-87, Jul. 1995.
Yoshio, O., "Ablation Characteristics of Silicone Insulation," Journal of Polymer Science: Part A: Polymer Chemistry, 36: 233-239, 1998.
Yuan, W. et al. "New Electrode Materials for Dielectric Elastomer Actuators, " Proc. SPIE, 6524 (6524ON), 2007.
Zhang, Q., V. Bharti and X. Zhao, "Giant Electrostriction and Relaxor Ferroelectric Behavior in Electron-irradiated Poly(vinylidene fluoride-trifluoroethylene) Copolymer," Science, vol. 280, pp. 2101-2104 (Jun. 26, 1998).
Zhang, Q.M., V. Bharti, Z.Y. Cheng, T.B. Xu, S. Wang, T.S. Ramotowski, F. Tito, and R. Ting, "Electromechanical Behavior of Electroactive P(VDF-TrFE) Copolymers," Proceedings of the SPIE International Symposium on Smart Structures and Materials: Electro-Active Polymer Actuators and Devices, Mar. 1-2, 1999, Newport Beach, CA, USA, pp. 134-139.
Zhang, Q.M., Z.Y. Cheng, V. Bharti, T.B. Xu, H. Xu, T. Mai and S.J. Gross, "Piezoelectric and Electrostrictive Polymeric Actuator Materials," Proceedings of the 7th SPIE Symposium on Smart Structures and Materials: Electroactive Polymers and Devices (EAPAD) Conference, Mar. 6-8, 2000, Newport Beach, CA, USA, pp. 34-50.
Zhenyi, M., J.I. Scheinbeim, J.W. Lee, and B.A. Newman. 1994. "High Field Electrostrictive Response of Polymers," Journal of Polymer Sciences, Part B-Polymer Physics, vol. 32, pp. 2721-2731, 1994.
U.S. Appl. No. 14/421,448, filed Feb. 13, 2015.
U.S. Appl. No. 14/421,450, filed Feb. 13, 2015.
U.S. Appl. No. 14/421,452, filed Feb. 13, 2015.
U.S. Appl. No. 14/435,761, filed Apr. 15, 2015.
U.S. Appl. No. 14/437,741, filed Apr. 22, 2015.
U.S. Appl. No. 14/440,991, filed May 6, 2015.
U.S. Appl. No. 14/649,743, filed Jun. 4, 2015.
Bar-Cohen, Y., "Electro Polymer Actuators and Devices (EAPAD)", Proceedings of SPIE—International Society of Optical Engineering, vol. 3987, presented at a conference Mar 6-8, 2000. (cited in U.S. Pat. No. 8,042,264, unable to locate).
Biomimetic Products, Inc., hhttp://www.biomimetic.com, no. date. (cited in U.S. Pat. No. 7,211,937, unable to locate).
Gardner, J.W., "Microsensors: Principles and Applications," John Wiley, 1994. (cited in U.S. Pat. No. 6,809,462, unable to locate).
Kornbluh, R., "Description of Children's Tour," Aug. 20, 2000. (cited in U.S. Pat. No. 7,211,937, unable to locate).
Kornbluh, R., "Elastomeric Polymer Actuator and Transducers: The Principles, Performance and Applications of a New High-Strain Smart Material Technology", SRI International Medtronic Forum, Brooklyn Center, Minnesota, Jan. 2000. (cited in U.S. Pat. No. 6,768,246, unable to locate).
Kornbluh, R., R. Pelrine, Q. Pei, and V. Shastri "Electroactive Polymer (EAP) Actuators as Artificial Muscles—Reality, Potential and Challenges", Chapter 16, available from SPIE Press on May 2001. (cited in U.S. Pat. No. 6,882,086, unable to locate).
Nguyen, T., Green, M., and Kornbluh, R., "Robotic Systems," in ONR Ocean, Atmosphere, and Space Fiscal Year 2000 Annual Reports (Jan. 2001). (cited in U.S. Pat. No. 7,211,937, unable to locate).
Pei, Q. et al., "Multifunctional Electroelastomer Rolls and Their Application for Biomimetic Walking Robots," Smart Structures and Materials 2002. Industrial and Commercial Applications of Smart Structures Technologies, San Diego, CA, USA, Mar. 18-21, 2002, vol. 4698, 2002, pp. 246-253, XP002291728, Proceedings of the SPIE, ISSN: 0277-786X, the whole document. (cited in U.S. Pat. No. 7,761,981, unable to locate).
Prahlad, H. et al., "Programmable Surface Deformation: Thickness-Mode Electroactive Polymer Actuators and their Applications," Proc. SPIE, vol. 5759, 102, 2005, 12 pages. (cited in U.S. Appl. No. 13/205,888, unable to locate).
Seoul et al., "Electrospinning of Poly(vinylidene fluoride) Dimethylformamide Solutions with Carbon Nanotubes," Department of Textile Engineering, Inha University, Mar. 31, 2003. (cited in U.S. Pat. No. 7,911,115, unable to locate).

\* cited by examiner

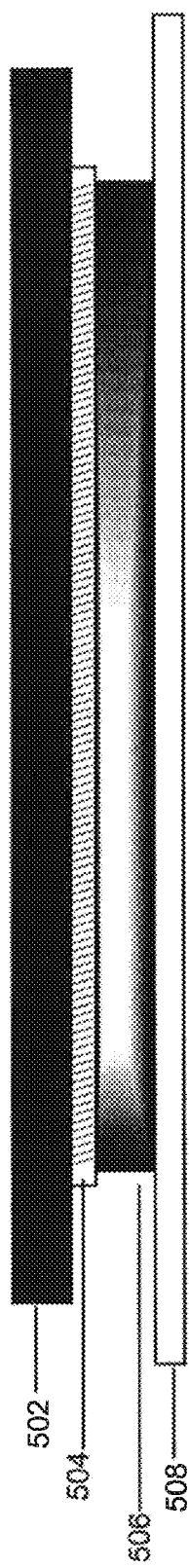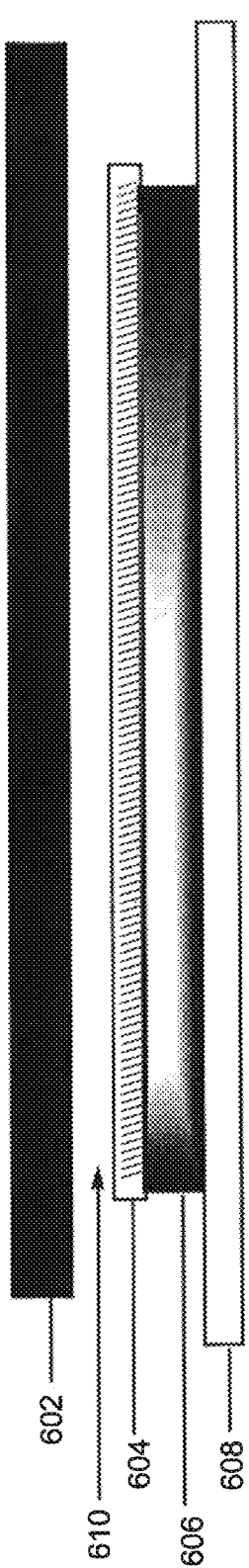
FIG. 5 (Prior Art)
FIG. 6

ELECTROACTIVE POLYMER ACTUATOR LENTICULAR SYSTEM

CROSS REFERENCE TO RELATED APPLICATIONS

This application claims priority to International Patent Application No. PCT/US2012/030030, filed Mar. 22, 2012, entitled "ELECTROACTIVE POLYMER ACTUATOR LENTICULAR SYSTEM," which application claims the benefit, under 35 USC §119(e), of U.S. provisional patent application No. 61/466,129 filed Mar. 22, 2011 entitled "ACTIVE LENTICULAR FOR LARGER SIZE USING BAR ACTUATOR", the entire disclosures of which are hereby incorporated by reference.

FIELD OF THE INVENTION

The present invention relates in general to optical systems and more specifically to lenticular lens systems which enable the viewer to see two or more images in a display, such as an artwork, sequentially by changing the angle of the lenticular lens with respect to the viewer or by changing the position of the lens with respect to the display.

BACKGROUND OF THE INVENTION

The kineograph, or flip book, was patented in 1897 by Linnet in GB189715668 as a means of advertising using animation of a linear sequence of images. These objects are oftentimes used as prizes, such as are found in breakfast cereal and CRACKER JACK boxes and as novelty or promotional items.

U.S. Published Patent Application No. 2010/0164329 relates the use of an electroactive polymer actuator to move a light source with respect to one or more reflectors to change the angle of the reflector (and the angle/intensity/focus of the output beam of light). A reflector can be between the light source and the user as well as behind the light source. The electroactive polymer actuator may be moved at different frequencies for different light effects. The frequency may be high enough that the user may not perceive the change in focus. Multiple actuators or phases of actuators may be used to direct the light in different directions.

U.S. Pat. No. 7,352,339, issued to Morgan et al., discloses sources of diffuse illumination for providing substantially uniform illumination to a surface. The diffuse illumination arises from varying the diffusion angle of light generated by a light emitting diode (LED) system. To vary the diffusion angle, a translucent member is placed between the LED system and the surface. Light emitted from the LED system across the translucent member can subsequently uniformly cover the surface. The translucent member can include a plurality of individual lenticular lenses. An electromagnetic actuator can be coupled to the LED-based light source and the translucent material and adapted to move the translucent material relative to the radiation generated by the LED-based light source.

SUMMARY OF THE INVENTION

The present invention provides an optical system comprising a lens element, a display unit displaced transversely from the lens element, at least one actuator coupled to at least one of the lens element or the display unit and capable of changing the position of the lens element relative to the display unit in a lateral direction, and an electronic control system capable of driving the at least one actuator to move in a programmed manner to control positioning of the lens element relative to the display unit. The optical system of the present invention may find use in point-of-purchase displays or general illumination applications.

These and other advantages and benefits of the present invention will be apparent from the Detailed Description of the Invention herein below.

BRIEF DESCRIPTION OF THE FIGURES

The present invention will now be described for purposes of illustration and not limitation in conjunction with the figures, wherein:

FIG. 5 illustrates the prior art method of stacking a lenticular system;

FIG. 6 shows the inventive method of stacking a lenticular system with a clearance between the display and the lens;

DETAILED DESCRIPTION OF TILE INVENTION

Figure 1:
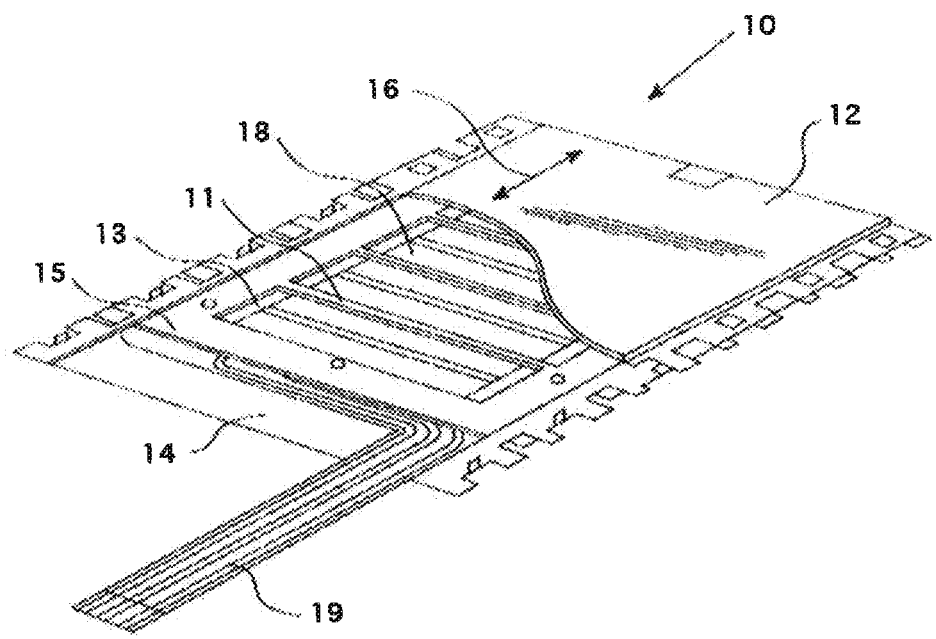
FIG. 1 is a cutaway view of an electroactive polymer actuator system, according to one embodiment.

Before explaining the disclosed embodiments in detail, it should be noted that the disclosed embodiments are not limited in application or use to the details of construction and arrangement of parts illustrated in the accompanying drawings and description. The disclosed embodiments may be implemented or incorporated in other embodiments, variations and modifications, and may be practiced or carried out in various ways. Further, unless otherwise indicated, the terms and expressions employed herein have been chosen for the purpose of describing the illustrative embodiments for the convenience of the reader and are not for the purpose of limitation thereof. Further, it should be understood that any one or more of the disclosed embodiments, expressions of embodiments, and examples can be combined with any one or more of the other disclosed embodiments, expressions of embodiments, and examples, without limitation. Thus, the combination of an element disclosed in one embodiment and an element disclosed in another embodiment is considered to be within the scope of the present disclosure and appended claims.

The present invention provides an optical system comprising a lens element, a display unit displaced transversely from the lens element, at least one actuator coupled to at least one of the lens element or the display unit and capable of changing position of the lens element relative to the display unit in a lateral direction, and an electronic control system capable of driving the at least one actuator to move in a programmed manner to control positioning of the lens element relative to the display unit. The optical system may further comprise one or more reflectors in some embodiments. The lens element may comprise one or more lenticular lenses or an array of lenses. The display may comprise two images or multiple images. The optical system may also be a lens stack which is illuminated by an array of LED light sources (or other light sources) as the display. Optionally, a second actuator capable of changing the transverse displacement between the lens element and the display unit may be included in some embodiments.

Lenticular lens systems enable the viewer to see sequentially two or more images printed in a display such as an artwork by changing the angle of the lenticular lens with respect to the viewer or by changing the position of the lens with respect to the display. In some embodiments, the display may comprise multiple images integrated to exhibit separately when viewed through different positions of the lenticular lens. With high quality artwork, multiple images may be arranged to enable the user to see the equivalent of a stop-action movie clip, similar to the effect seen in a kineograph or flip book. Electroactive polymer actuators may be used to change the position of the lens with respect to the artwork with high precision and speed. The motion of the actuator may be controlled with constant or variable rates to create different visual effects.

Examples of electroactive polymer devices and their applications are described, for example, in U.S. Pat. Nos. 7,394,282; 7,378,783; 7,368,862; 7,362,032; 7,320,457; 7,259,503; 7,233,097; 7,224,106; 7,211,937; 7,199,501; 7,166,953; 7,064,472; 7,062,055; 7,052,594; 7,049,732; 7,034,432; 6,940,221; 6,911,764; 6,891,317; 6,882,086; 6,876,135; 6,812,624; 6,809,462; 6,806,621; 6,781,284; 6,768,246; 6,707,236; 6,664,718; 6,628,040; 6,586,859; 6,583,533; 6,545,384; 6,543,110; 6,376,971; 6,343,129; 7,952,261; 7,911,761; 7,492,076; 7,761,981; 7,521,847; 7,608,989; 7,626,319; 7,915,789; 7,750,532; 7,436,099; 7,199,501; 7,521,840; 7,595,580; and 7,567,681, and in U.S. Patent Published Application Nos. 2009/0154053; 2008/0116764; 2007/0230222; 2007/0200457; 2010/0109486; and 2011/128239, and PCT Publication No. WO2010/054014, the entireties of which are incorporated herein by reference.

The present disclosure provides various embodiments of electroactive polymer actuator lenticular devices. Before launching into a description of various lenticular devices comprising an electroactive polymer actuator, the present disclosure briefly turns to FIG. 1, which provides a cutaway view of an electroactive polymer actuator that may be integrally incorporated in the optical system of the present invention. Accordingly, one embodiment of an electroactive polymer actuator is now described with reference to the module 10.

An electroactive polymer actuator slides an output plate 12 (e.g., sliding surface) relative to a fixed plate 14 (e.g., fixed surface) when energized by a high voltage. The plates 12, 14 are separated by steel balls, and have features that constrain movement to the desired direction, limit travel, and withstand drop tests. For integration into an optical system, the top plate 12 may be attached to an inertial mass such the display unit of the optical system. In the embodiment illustrated in FIG. 1, the top plate 12 of the module 10 comprises a sliding surface that mounts to an inertial mass or back of the optical system that can move bi-directionally as indicated by arrow 16. Between the output plate 12 and the fixed plate 14, the module 10 comprises at least one electrode 18, optionally, at least one divider 11, and at least one portion or bar 13 that attaches to the sliding surface, e.g., the top plate 12. Frame and divider segments 15 attach to a fixed surface, e.g., the bottom plate 14. The module 10 may comprise any number of bars 13 configured into arrays to amplify the motion of the sliding surface. The module 10 may be coupled to the drive electronics of an actuator controller circuit via a flex cable 19.

Advantages of the electroactive polymer module 10 include providing smooth motion, consuming significantly less battery life, and suitability for customizable design and performance options. A flat, small, and lightweight form factor is particularly suitable for point-of-purchase displays and low profile lighting systems. The module 10 is representative of actuator modules developed by Artificial Muscle, Inc., of Sunnyvale, Calif. In the present invention, an electronic control system is used to afford the smooth motion of the lens element. Such a control system is capable of driving the actuator to move in a programmed manner to control positioning of the lens element relative to the display unit. Suitable electronic control systems are disclosed, for example, in U.S. Published Patent Application Nos. 2009/0147340 and 2010/0033835, the entireties of which are incorporated herein by reference.

Still with reference to FIG. 1, many of the design variables of the module 10, (e.g., thickness, footprint) may be fixed by the needs of module integrators while other variables (e.g., number of dielectric layers, operating voltage) may be constrained by cost. Since actuator geometry—the allocation of footprint to rigid supporting structure versus active dielectric—does not impact cost much, it is a reasonable way to tailor performance of the module 10 to an application where the module 10 is integrated with an optical device.

Figure 2:
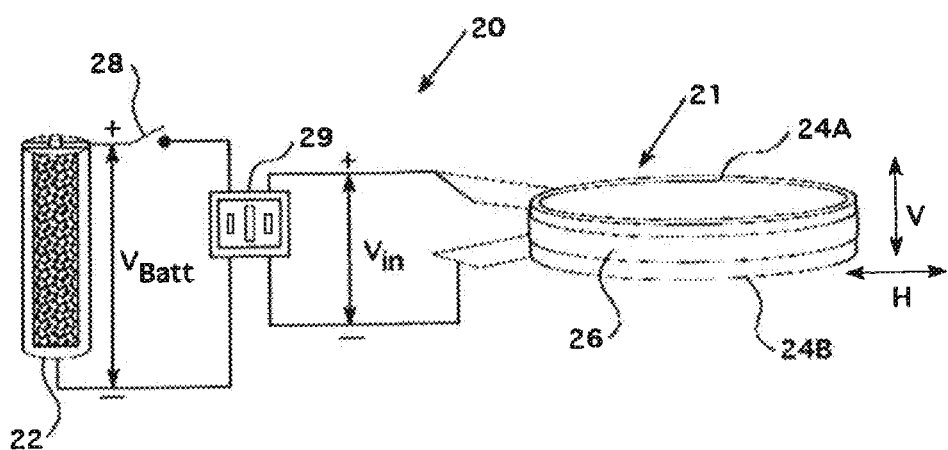
FIG. 2 is a schematic diagram of one embodiment of an electroactive polymer actuator system to illustrate the principle of operation.

FIG. 2 is a schematic diagram of one embodiment of an actuator system 20 to illustrate the principle of operation. The actuator system 20 comprises a power source 22, shown as a low voltage direct current (DC) battery, electrically coupled to an actuator module 21. The actuator module 21 comprises a thin elastomeric dielectric 26 disposed (e.g., sandwiched) between two conductive electrodes 24A, 24B. In one embodiment, the conductive electrodes 24A, 24B are stretchable (e.g., conformable or compliant) and may be printed on the top and bottom portions of the elastomeric dielectric 26 using any suitable techniques, such as, for example screen printing. The actuator module 21 is activated by coupling the battery 22 to an actuator circuit 29 by closing a switch 28. The actuator circuit 29 converts the low DC voltage $V_{Batt}$ into a high DC voltage $V_{in}$ suitable for driving the module 21. The actuator circuit 29 may also comprise electronics components including microprocessors, memory, and signal generators, capable of generating specific patterns or waveforms or voltage drive signals to drive the motion of the actuator module 21. When the high voltage $V_{in}$ is applied to the conductive electrodes 24A, 24B the elastomeric dielectric 26 contracts in the vertical direction (V) and expands in the horizontal direction (H) under electrostatic pressure. The contraction and expansion of the elastomeric dielectric 26 can be harnessed as motion. The amount of motion or displacement is proportional to the input voltage $V_{in}$. The motion or displacement may be amplified by a suitable configuration of actuators as described below in connection with FIGS. 3A, 3B, and 3C.

Figure 3A:
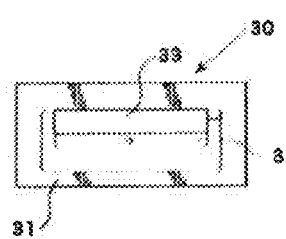
FIGS. 3A, 3B, and 3C illustrate three possible configurations, one/three/six bar actuator arrays, according to various embodiments.
Figure 3B:
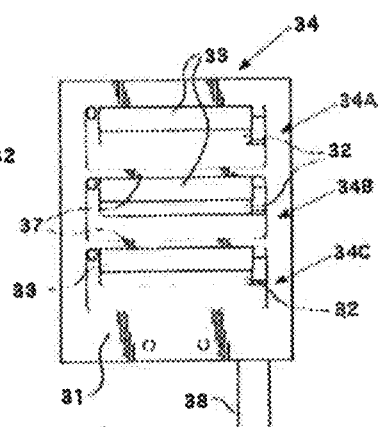

FIGS. 3A, 3B, 3B illustrate three possible configurations, among others, of actuator arrays 30, 34, 36, according to various embodiments. Various embodiments of actuator arrays may comprise any suitable number of bars depending on the application and physical spacing restrictions of the application. Additional bars provide additional displacement and therefore enhance the motion of the display that the user can appreciate substantially immediately. The actuator arrays 30, 34, 36 may be coupled to the drive electronics of an actuator controller circuit via, a flex cable 38.

FIG. 3A illustrates one embodiment of a one bar actuator array 30. The single bar actuator array 30 comprises a fixed plate 31, an electrode 32, and an elastomeric dielectric 33 coupled to the fixed plate 31.

FIG. 3B illustrates one embodiment of a three bar actuator array 34 comprising three bars 34A, 34B, 34C coupled to a fixed frame 31, where each bar is separated by a divider 37. Each of the bars 34A-C comprises an electrode 32 and an elastomeric dielectric 33. The three bar array 34 amplifies the motion of the sliding surface in comparison to the single bar actuator array 30 of FIG. 3A.

Figure 3C:
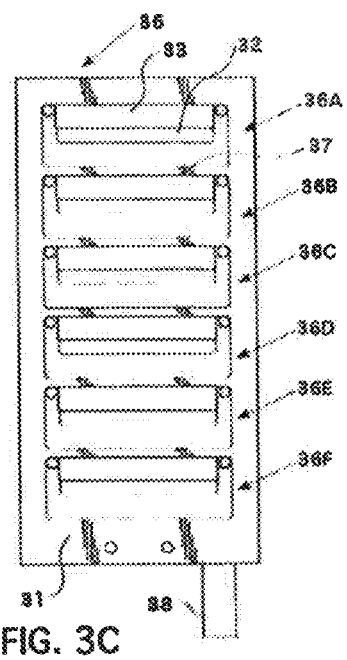

FIG. 3C illustrates one embodiment of a six bar actuator array 36 comprising six bars 36A, 36B, 36C, 36D, 36E, 36F coupled to a fixed frame 31, where each bar is separated by a divider 37. Each of the bars 34A-F comprises an electrode 32 and an elastomeric dielectric 33. The six bar actuator array 36 amplifies the motion of the sliding surface in comparison to the single bar actuator array 30 of FIG. 3A and the three bar actuator array 34 of FIG. 3B.

Figure 4:
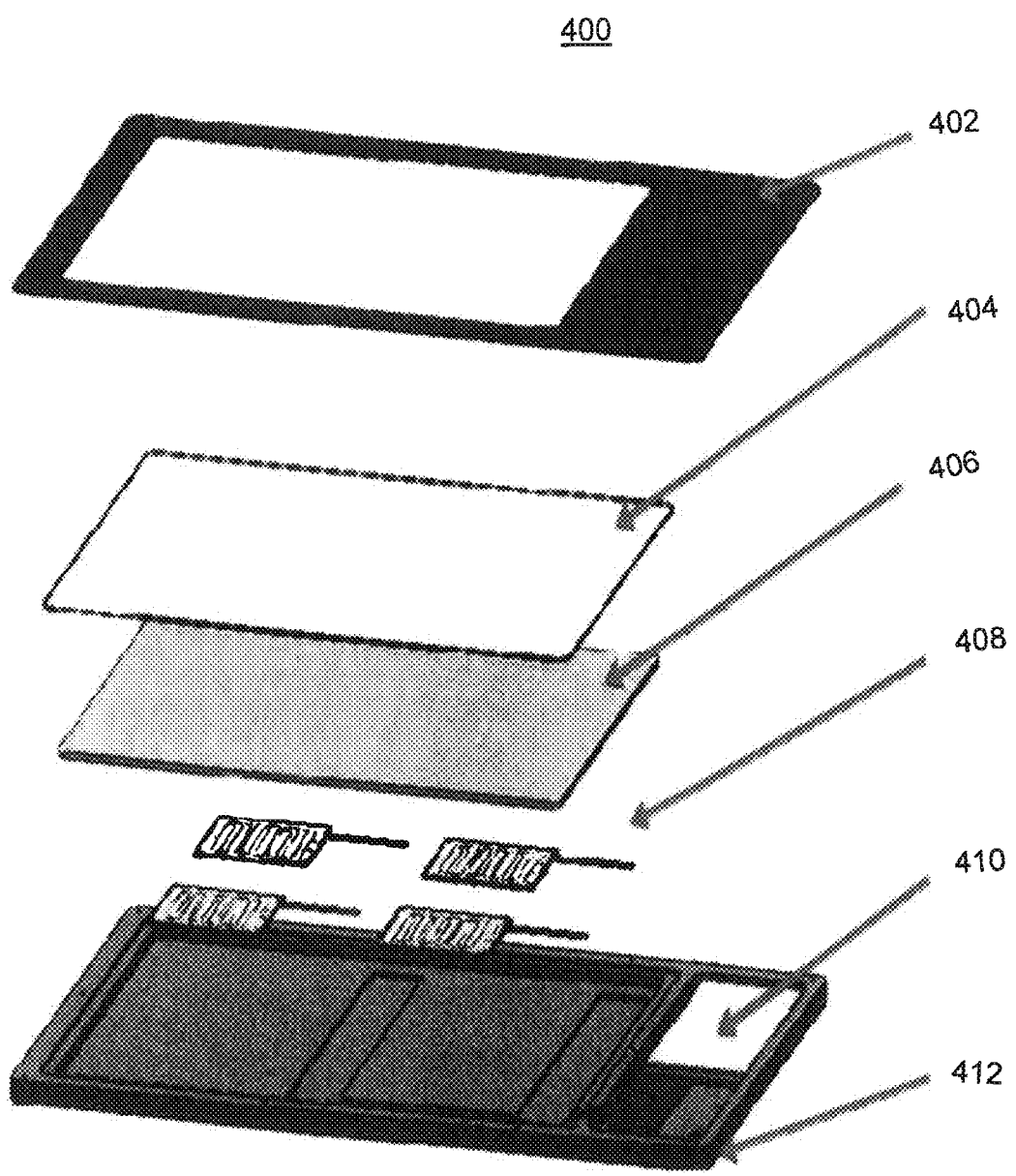
FIG. 4 provides an exploded view of one embodiment of the electroactive polymer actuator lenticular device of the present invention.

FIG. 4 illustrates an exploded view of one embodiment of the optical system of the present invention 400. The system depicted in FIG. 4 comprises a top cover 402, which is fixed. A fixed lens element 404 and a movable display unit 406 are arranged below the top cover 402 and rest on actuators 408 which along with fixed battery and electronics 410 are located in main housing 412. The lens element may be a lenticular lens and may comprise multiple lenses.

FIG. 5 illustrates a prior art method of arranging the elements of an optical system 500. Lens 502 is in contact with artwork 504 which contacts actuator 506 which contacts housing 508. One problem encountered with the prior art method was friction between the lens and artwork along with the friction by-products such as jittery or jumpy motion and hysteresis. Because there was no need to move the artwork relative to the lens, the lens was always designed to be focused on the artwork when in full contact with each other.

As mentioned herein, moving displays cause friction problems; therefore, the present inventors positioned a clearance (gap) between the display unit and the lens to eliminate the friction. This embodiment of the optical system of the present invention 600 is illustrated in FIG. 6, where lens element 602 is not in contact with display unit 604, but is separated by a gap 610. Electroactive polymer actuator 606 lies beneath display unit 604 and is in contact with housing 608. In principle, the gap between the lens and the display unit may be any distance; however, it should be remembered that the gap will require a change in focal length of the lens element to ensure that it focuses on the display correctly. The gap may be created, for example, by stand-offs between the lens element 602 and the housing 608. These standoffs may be separate piece parts as is known in the art. They may also be molded into either the lens element 602 or the housing 608. Alternatively, the standoffs may comprise springs or telescoping sections which enable the adjustment of the gap.

Figure 7:
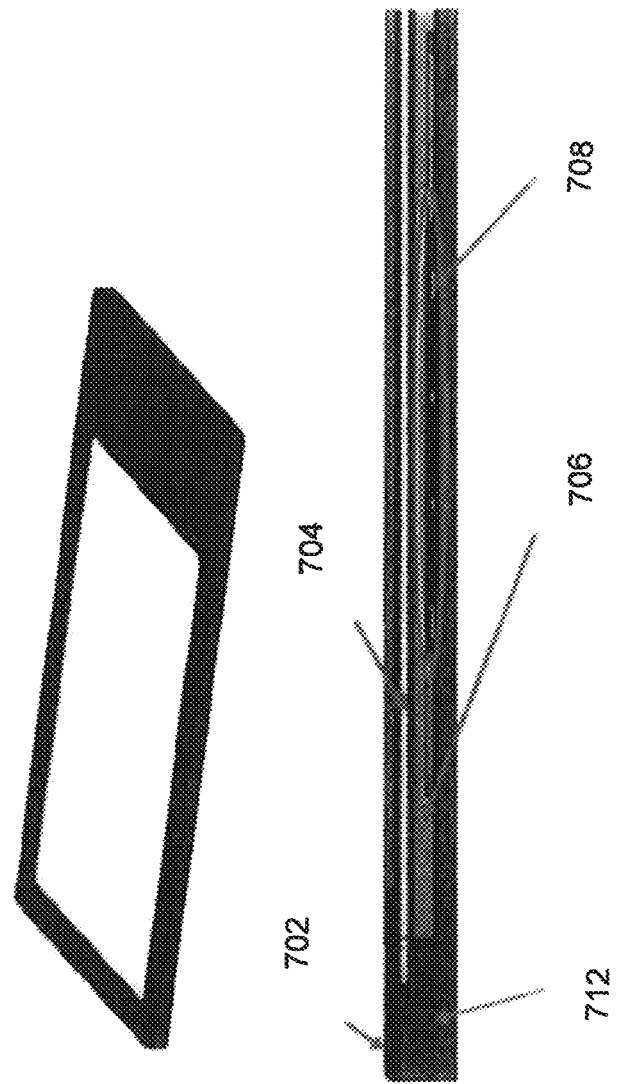
FIG. 7 is a side view of the embodiment of the electroactive polymer actuator lenticular device of the present invention shown in FIG. 4.

FIG. 7 provides a side view of the embodiment of the optical system of the present invention shown in FIG. 4. The system depicted in FIG. 7 comprises a top cover 702, which is fixed. A fixed lens element 704 and a movable display unit 706 are arranged below the top cover 702 and rest on actuators 708 which along with fixed battery and electronics 710 are located in main housing 712.

Figure 8:
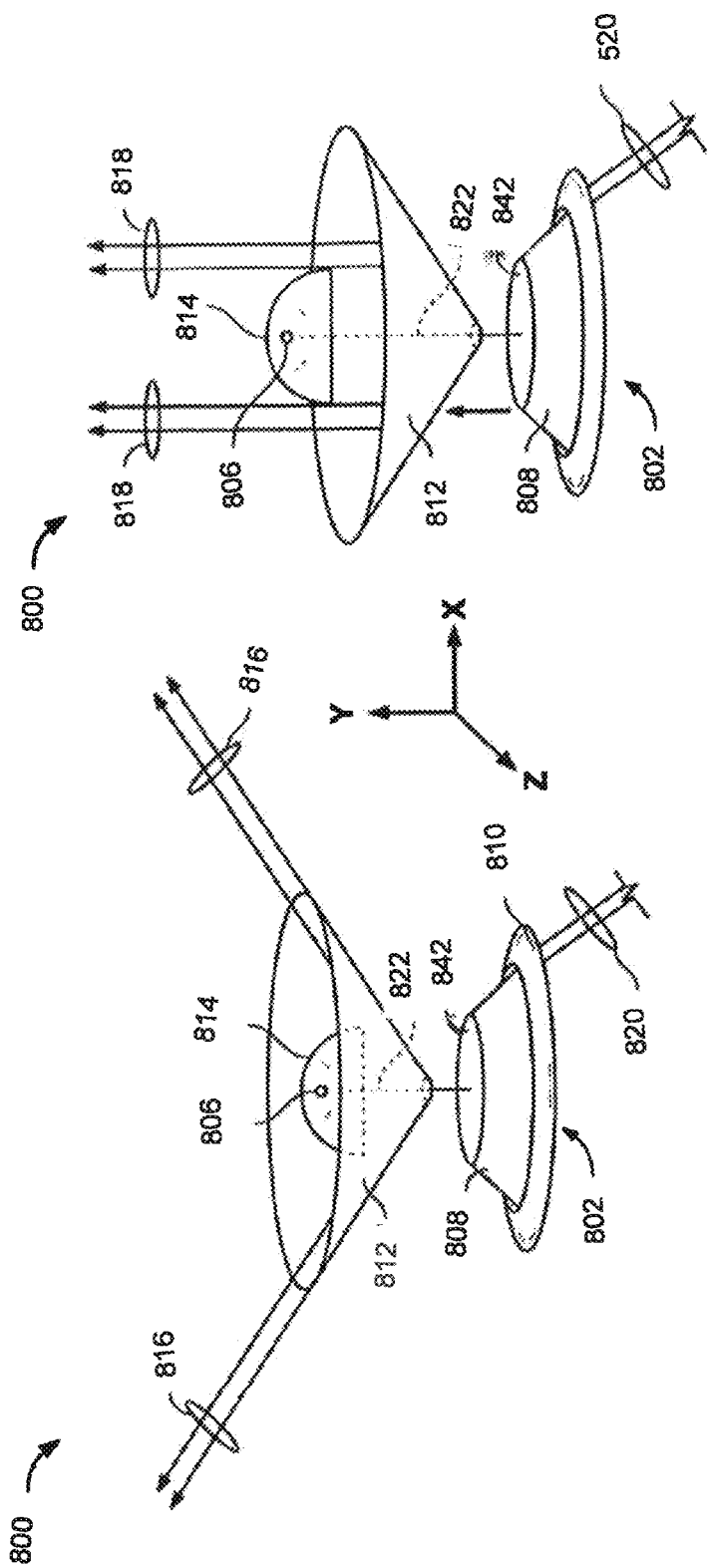
FIGS. 8A and 8B provide a schematic illustration of one embodiment of a lighting system useful in the present invention.

Electroactive polymer actuators have application in the lighting industry, in the context of both wall socket (120V/60 Hz power) driven/stationary lighting systems and battery-operated/mobile lighting systems. FIGS. 8A and 8B illustrate a schematic representation of an exemplary arrangement of such a lighting system 800. Here, a single-phase, single frustum-type electroactive polymer actuator 802 is employed which includes a diaphragm 808 affixed to a frame 810. The diaphragm may be weighted with a cap 842 having a selected mass to achieve the desired resonance frequency of the diaphragm. The diaphragm may also be pre-biased upwards by any suitable biasing means (not shown), e.g., a spring, to enhance performance of the actuator. Actuator 802 is in positional contact with or otherwise mechanically coupled by way of a stem or rod 822 to a light source 806, which is any suitable light source depending on the application at hand. Upon application of a voltage to the actuator via lead lines 820 coupled to a power supply (not shown), diaphragm 808 relaxes and is moved in the z-axis along with rod 822 and light source 806 are also displaced in the same direction, as illustrated in FIG. 8B.

Positioned about the light source is a reflector assembly which includes one or more reflectors, e.g., mirrors, or lenses. Although any number of reflectors may be used, here, two reflectors are used—a primary reflector 812 positioned between actuator 802 and light source 806 and about the z-axis to create the primary reflecting surface, and a secondary reflector 814 positioned on the opposite side of the light source. This arrangement provides a reflector "ring", however, any other suitable arrangement of reflectors and the resulting construct may be employed with the present invention. In the illustrated embodiment, secondary reflector 814, unlike primary reflector 812, is mechanically coupled to light source 806, and therefore exhibits no movement relative to light source 806 (i.e., secondary reflector is displaced together with the light source). In other embodiments, the light source and the secondary reflector may be stationary and the primary reflector movable relative thereto. The latter configuration is advantageous where the light source/secondary reflector combination is heavier than the primary reflector or where type of light source used is particularly sensitive to vibrational movement such as a filament type incandescent bulb.

In any case, primary reflector 812 is designed to do the bulk of the variable direction ray reflection. For example, at least half of the light emitted from light source 806 is designed to hit primary reflector 812 first and be reflected in the desired direction without the necessity of being diverted by secondary reflectors. Secondary reflector 814 is responsible for diverting rays emitted from light source 806 in the upper hemisphere back down to primary reflector 812 in a concentrated ray. Depending on the application, a tertiary reflector or reflectors (not shown), which are also stationary relative to the primary reflector, may be employed to assist in redirecting stray rays from the light source. In any case, the resulting reflected light ray is made up of substantially all available light provided by light source 806.

By operating electroactive polymer actuator 802 between the high and low positions, as shown in FIGS. 8A and 8B, respectively, (or between any number of positions there between) at a frequency which is greater than that perceptible by the human eye, i.e., >25 Hz, light source 806 is moved relative to the primary reflector 812. The variable focal length to the reflector ring creates the ability to change the overall focus of the emitted light. As illustrated, broader band light rays 816 are provided when the light source is in the "low" position and narrower band light rays 818 are provided when the light source is in the "high" position.

Any arrangement of actuators, light sources and reflectors/lenses may be employed, in the subject systems where the relative motion between the light source(s) and reflector(s)/lens(es) is adjusted at a high rate of speed. As such, an alternative arrangement to the one illustrated in FIGS. 8A and 8B is one that couples the reflector assembly, or one or more reflectors/lenses thereof, to the electroactive polymer actuator to adjust its position relative to the light source(s). Alternatively, both the light source as well as the reflector assembly may be driven each by its own actuator to provide more control over the direction and diffusion of the light vector. Individual reflectors/lenses or groups of reflectors/lens may be driven or moved independently of each other to provide multi-faceted directionality to the light rays. Furthermore, any number of electroactive polymer diaphragms may be used to construct the subject actuators. For example, actuators having a stacked diaphragm configuration may be used to increase maximum displacement of a light source and/or reflector assembly.

Figure 9:
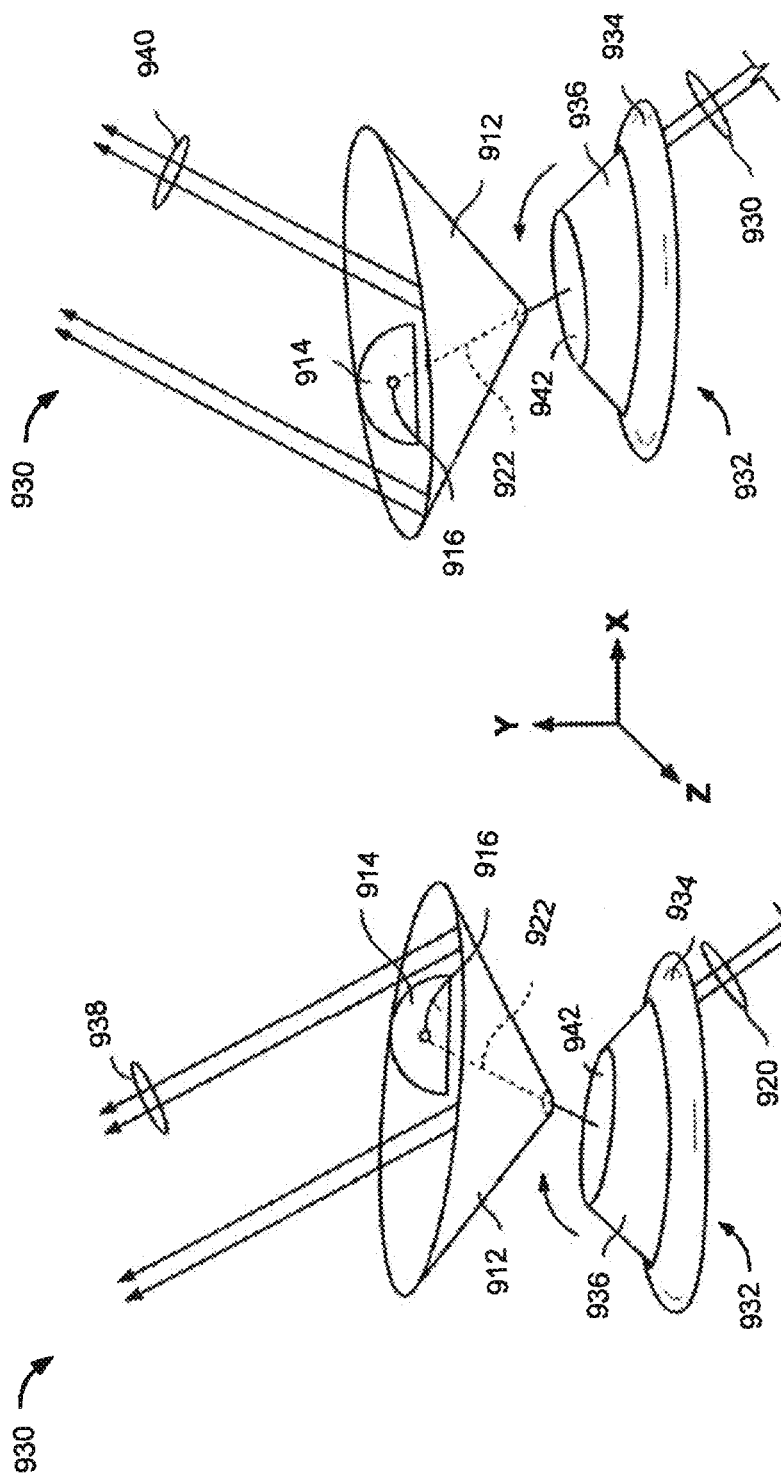
FIGS. 9A and 9B provide a schematic illustration of another embodiment of a lighting system useful in the present invention.

Still further, a multi-phase electroactive polymer actuator may be employed to provide a unique lighting pattern, e.g., a strobe effect, flashing, etc. For example, a single, variable-phase actuator, may be used to displace the light source and/or the reflector/lens assembly to change directionality of the light rays where the directionality depends on the "phase" in which the actuator is operated. Such a lighting system 930 is illustrated in FIGS. 9A and 9B, where selected portions of the multi-phase diaphragm 936 of actuator 932 having frame 934 may be activated to change the direction of the reflected rays. The diaphragm may have any number of phases to provide the desired effect. For example, FIGS. 9A and 9B show actuator 932 acting in a bi-lateral manner to provide left-directed rays 938 and right-directed rays 940. A greater number of phases may be employed to produce a rotating light effect, such as those used on emergency vehicles, or a "wobble" pattern.

Those skilled in the art will appreciate than any number of lighting system architectures of the present invention may be employed. An aspect of the systems is achieve an efficient input voltage-to-diaphragm displacement ratio by providing or tuning the electroactive polymer actuators to operate at their natural frequency. Suitable power supplies for such applications are configured to generate high oscillating voltages from a direct current (DC) power source, such as a high voltage transistor array. Any increase in space requirements of the power supply are offset by the reduced requirement for bulky chemical energy storage, i.e., batteries, as the power supply is lighter than most batteries, making the overall system lighter and more efficient.

As for light sources, any type may be employed with the subject systems, depending on the desired lighting elect. For example, for directed light, light-emitting diodes (LEDs) may be employed, whereas conventional incandescent lights may be used to produce diffuse light. Short arc high intensity discharge light sources are the closest to point light sources and are therefore easily usable in the high efficiency light systems of the present invention.

The present invention provides in some embodiments, a lighting or illumination system using the lens stack with an array of LED light sources (or other light sources) as the display. The light sources may emit the same or different colors. In some embodiments, the display may include a layer of phosphors placed between the LED light sources and the lens stack. The phosphor layer may be excited by light from the LEDs and emit light of a different color. The phosphor layer may comprise a single chemical composition or may have regions of different chemical compositions which may emit different colors. By moving the lens array either laterally or transversely with respect to the LED light source array, the light perceived by the user can change in intensity, focus, and beam direction.

Where the array of LEDs contains multiple colors of LED light sources or excites an array of multiple compositions of phosphors, the relative intensities of the different colors of light emitted may be varied by moving the lens array laterally with respect to the LED array so the user will perceive different mixtures of colored light. The actuator(s) may be moved at different frequencies or with variable rates to provide complex patterns of colors, intensity, focus, and other lighting effects such as a stroboscopic effect. The actuator(s) may also be moved to a specific position for a constant color, intensity, and focus. A reflector or array of reflectors may be included in the stack for more capability in changing intensity, focus, and beam direction, particularly where the optical system includes an additional actuator which can change the displacement between any combination of the lens array, the reflector, and the LED array. In some embodiments, individual reflectors may be interspersed between and among the LEDs in an LED array. In other embodiments, reflectors may be situated above the LEDs beneath the lens element.

Figure 10:
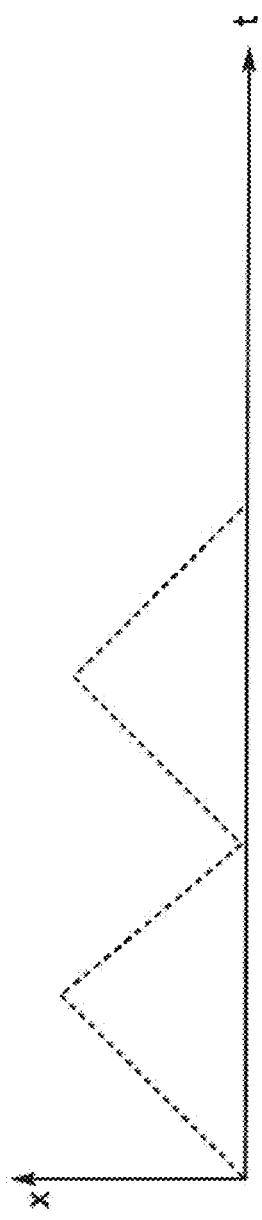
FIG. 10 is a graph showing the steady, constant rate motion of a display with respect to a lens.
Figure 11:
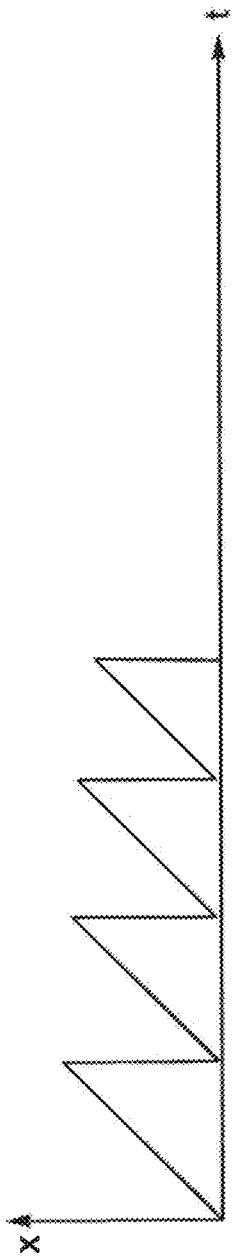
FIG. 11 is a graph showing variable rate motion for rapid return to a starting position of a display with respect to a lens element.

As illustrated in FIGS. 10 and 11, electroactive polymer actuators permit the system to have different motion regimens. FIG. 10 shows an example of a motion with the constant rate in both directions of movement. FIG. 11 shows an example of a motion with a variable rate, here a snap back action. The motion regimen depicted in FIG. 11 is particularly advantageous for lenticular systems where the forward motion of the actuator enables the viewer to see a series of images similar to a video clip. The snap-back motion of the actuator enables a rapid return to the first image to reset the series of images without the viewer having to see the series of images in reverse. Those skilled in the art will appreciate there are many other potential motion regimens that could be given based on application requirements including a regimen where the actuator is moved and held at a set position to hold a fixed position of the lens element relative to the display. The motion regimen should preferably be matched with the artwork to create the proper intended visual effect.

Figures 12A, 12B, 12C:
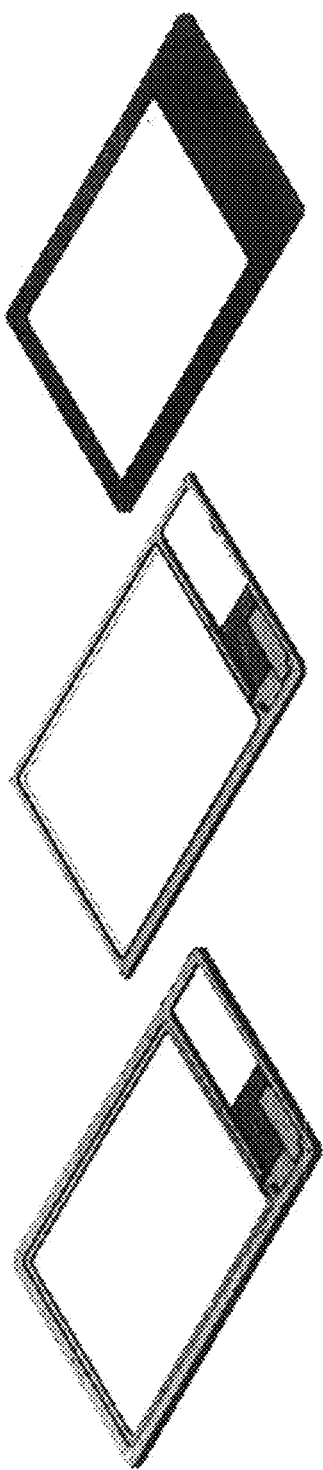
FIG. 12 shows the sequence of steps for assembly of an embodiment of optical system which comprises artwork as the display.

FIGS. 12A, 12B and 12C illustrate the steps of assembling an optical system which has an artwork as the display in this embodiment. FIG. 12A depicts the artwork laminated to the moving plate (shown as 406 in FIG. 4). FIG. 12B shows the lens element placed over the artwork while leaving a gap to prevent friction and jittery motion. FIG. 12C shows attachment of the top cover Which may be secured by fasteners, such as screws.

The foregoing examples of the present invention are offered for the purpose of illustration and not limitation. It will be apparent to those skilled in the art that the embodiments described herein may be modified or revised in various ways without departing from the spirit and scope of the invention. The scope of the invention is to be measured by the appended claims.

What is claimed is:
1. An optical system comprising:
 a lens element;
 a display unit displaced transversely from the lens element, said display unit containing a display;

at least one actuator coupled to at least one of the lens element or the display unit and capable of changing position of the lens element relative to the display unit in a lateral direction; and an electronic control system capable of driving the at least one actuator to move in a programmed manner to control positioning of the lens element relative to the display unit.

2. The optical system according to claim 1 further comprising at least one reflector.

3. The optical system according to claim 1 further comprising at least a second actuator capable of changing the transverse displacement between the lens element and the display unit.

4. The optical system according to claim 3, wherein the second actuator comprises an electroactive polymer actuator.

5. The optical system according to any one of claims 1 to 3, wherein the lens element comprises multiple lenses.

6. The optical system according to any one of claims 1 to 3, wherein the lens element comprises a lenticular lens.

7. The optical system according to claim 6, wherein the display comprises multiple images integrated to exhibit separately when viewed through different positions of the lenticular lens.

8. The optical system according to claim 7, wherein motion of the at least one actuator enables a user to view a sequence of images.

9. The optical system according to any one of claims 1 to 3, wherein the display comprises an array of light sources.

10. The optical system according to claim 9, wherein the light sources emit light of different colors.

11. The optical system according to claim 9, wherein the display comprises an array of light emitting diode (LED) light sources.

12. The optical system according to claim 11, wherein the array excites a phosphor layer to emit light of a color different from the color of the light emitting diode (LED) light sources.

13. The optical system according to claim 12, wherein the phosphor layer comprises regions with different phosphor compositions to emit different colors when excited by the light emitting diode (LED) light sources.

14. The optical system according to claim 10, wherein motion of the at least one actuator provides illumination comprising a mixture of different colors of the light sources based on the relative position of the array of light sources and the lens element.

15. The optical system according to any one of claims 1 to 3, wherein motion of the at least one actuator is programmed to cycle between positions of the lens element relative to the display unit at one selected from the group consisting of a constant rate, a variable rate, and a combination thereof.

16. The optical system according to any one of claims 1 to 3, wherein motion of the at least one actuator is programmed to set a fixed position of the lens element relative to the display unit.

17. The optical system according to any one of claims 1 to 3, wherein the at least one actuator comprises an electroactive polymer actuator.

* * * * *